US012714278B2

(12) United States Patent
Li et al.

(10) Patent No.: US 12,714,278 B2
(45) Date of Patent: Aug. 25, 2026

(54) METHOD AND APPARATUS OF RE-CLEANING, CLEANING ROBOT, AND STORAGE MEDIUM

(71) Applicant: SHENZHEN SILVER STAR INTELLIGENT GROUP CO., LTD., Shenzhen (CN)

(72) Inventors: Meng Li, Shenzhen (CN); Guoyan Tan, Shenzhen (CN); Qian Sun, Shenzhen (CN); Juanjuan Ren, Shenzhen (CN); Yue Ban, Shenzhen (CN); Lirong Ye, Shenzhen (CN)

(73) Assignee: SHENZHEN SILVER STAR INTELLIGENT GROUP CO., LTD., Shenzhen (CN)

( * ) Notice: Subject to any disclaimer, the term of this patent is extended or adjusted under 35 U.S.C. 154(b) by 453 days.

(21) Appl. No.: 18/349,944

(22) Filed: Jul. 10, 2023

(65) Prior Publication Data

US 2024/0023779 A1 Jan. 25, 2024

(30) Foreign Application Priority Data

Jul. 21, 2022 (CN) ........................ 202210873679.X

(51) Int. Cl.
*A47L 11/40* (2006.01)
*G05D 1/00* (2024.01)

(52) U.S. Cl.
CPC ........ *A47L 11/4011* (2013.01); *G05D 1/0214* (2013.01); *G05D 1/0217* (2013.01);
(Continued)

(58) Field of Classification Search
CPC ............. A47L 11/4011; A47L 2201/04; A47L 2201/06; A47L 11/4061; A47L 2201/00;
(Continued)

(56) References Cited

U.S. PATENT DOCUMENTS 4,152,765 A * 5/1979 Weber .................. G05B 19/409 700/185
4,307,447 A * 12/1981 Provanzano ........... G05B 19/05 700/1

(Continued)

FOREIGN PATENT DOCUMENTS

| CN | 106502248 | 3/2017 |
|---|---|---|
| CN | 107831773 | 3/2018 |
| CN | 112161629 | 1/2021 |

OTHER PUBLICATIONS

"Office Action of China Counterpart Application", issued on Feb. 22, 2024, with English translation thereof, p. 1-p. 29.

*Primary Examiner* — Bhavesh V Amin
(74) *Attorney, Agent, or Firm* — Zhigang Ma

(57) ABSTRACT

Disclosed are a method and an apparatus of re-cleaning, a cleaning robot, and a storage medium for improving cleaning quality. The method of re-cleaning includes: obtaining a grid map of a target area, wherein the grid map includes at least one primary cleaning partition; determining whether a primary cleaning partition meeting a re-cleaning condition is present, if so, the primary cleaning partition meeting the re-cleaning condition is designated as a re-cleaning partition to obtain at least one re-cleaning partition, wherein the re-cleaning condition is that the primary cleaning partition is provided with an along-wall mark and is not filled up by a cleaning mark; determining whether a re-cleaning partition that the cleaning robot can reach is present in the at least one re-cleaning partition according to a preset obstacle information database; and if so, navigating to a target partition for cleaning.

18 Claims, 12 Drawing Sheets

(52) U.S. Cl.
CPC ......... *G05D 1/0238* (2013.01); *G05D 1/0274* (2013.01); *A47L 2201/04* (2013.01); *A47L 2201/06* (2013.01)

(58) Field of Classification Search
CPC .. G05D 1/0214; G05D 1/0217; G05D 1/0238; G05D 1/0274; G05D 1/2464; G05D 1/6482; G05D 2105/10; G05D 2107/40; G05D 2109/10; G05D 1/0246
See application file for complete search history.

(56) References Cited

U.S. PATENT DOCUMENTS 5,231,565 A * 7/1993 Bilas ........................ H02H 3/00 700/286
5,233,511 A * 8/1993 Bilas .................... H05K 7/1479 361/644
5,249,115 A * 9/1993 Reid .................... G05B 19/042 700/12
5,253,159 A * 10/1993 Bilas ................... H02J 13/1317 700/286
5,453,130 A * 9/1995 Maddox .................... E03F 3/06 134/22.12
5,487,172 A * 1/1996 Hyatt ...................... G06F 13/16 700/8
5,491,625 A * 2/1996 Pressnall ............... G06F 11/328 714/E11.181
5,659,466 A * 8/1997 Norris .................... H03K 23/68 713/1
6,549,326 B2 * 4/2003 Hunt .................. G02B 26/0841 348/625
6,571,146 B1 * 5/2003 Dennehy ................. G06F 30/18 700/98
7,088,835 B1 * 8/2006 Norris .................... G10H 7/002 381/104
7,089,530 B1 * 8/2006 Dardinski .............. G05B 15/02 717/109
7,211,980 B1 * 5/2007 Bruemmer ........... G05D 1/0246 318/587
7,224,509 B2 * 5/2007 Hewlett ................. G09G 3/346 348/E5.142
7,277,777 B2 * 10/2007 Draxton ............ G01N 33/0062 702/182
7,324,870 B2 * 1/2008 Lee ...................... G05D 1/0242 700/254
7,495,671 B2 * 2/2009 Chemel ................ H05B 47/155 715/764
7,805,220 B2 * 9/2010 Taylor .................. G05D 1/0274 318/568.17
7,990,394 B2 * 8/2011 Vincent ................... G06T 19/20 700/208
8,073,565 B2 * 12/2011 Johnson ................ H04W 4/025 455/456.3
8,224,516 B2 * 7/2012 Anderson ............ G05D 1/0246 701/28
8,374,721 B2 * 2/2013 Halloran ................. B60L 53/14 342/450
8,378,613 B2 * 2/2013 Landry ................... A47L 9/281 15/327.5
8,515,207 B2 * 8/2013 Chau ....................... G06F 16/58 700/62
8,556,223 B2 * 10/2013 Balfour .................. H02G 7/056 248/548
8,670,866 B2 * 3/2014 Ziegler ................. A47L 11/302 318/609
8,748,814 B1 * 6/2014 Xiao ....................... H01J 37/28 250/306
8,818,833 B2 * 8/2014 Druyan ............ G06Q 10/06315 719/318
8,874,273 B2 * 10/2014 Sun .................... G01N 21/6428 700/266
8,879,426 B1 * 11/2014 Quilling ................ H04W 40/20 700/250
9,021,431 B2 * 4/2015 Laval ........................ G06F 8/38 717/121
9,233,472 B2 * 1/2016 Angle .................... B25J 13/006
9,375,847 B2 * 6/2016 Angle ................... H04L 12/282
9,380,922 B2 * 7/2016 Duffley ................ G05D 1/0016
9,432,807 B2 * 8/2016 Kern, Jr. ............ G08B 21/0261
9,476,730 B2 * 10/2016 Samarasekera .... G01C 21/3852
9,480,381 B2 * 11/2016 Schnittman ........... A47L 9/0488
9,504,369 B2 * 11/2016 So ........................ G05D 1/0219
9,737,188 B2 * 8/2017 Jang .................... A47L 11/4061
10,168,709 B2 * 1/2019 Kleiner .................. G05D 1/223
10,285,557 B2 * 5/2019 Park .................... A47L 11/4008
10,551,841 B2 * 2/2020 Yun ....................... A47L 9/2805
10,583,561 B2 * 3/2020 Suvarna ............... G05D 1/0263
10,816,989 B2 * 10/2020 Chen .................... G05D 1/0274
10,824,166 B2 * 11/2020 Hsu ...................... G05D 1/0274
11,131,996 B2 * 9/2021 Liu ...................... G05D 1/0219
11,224,325 B2 * 1/2022 Takaoka .............. A47L 11/4061
11,249,482 B2 * 2/2022 Munich ................ G05D 1/0212
11,253,124 B2 * 2/2022 Knuth .................. G05D 1/0214
11,266,287 B2 * 3/2022 Munich ............... A47L 11/4061
11,272,823 B2 * 3/2022 Orzechowski ....... G05D 1/0274
11,571,813 B2 * 2/2023 Narayana ............. G05D 1/0238
11,613,017 B2 * 3/2023 Denenberg ............. B25J 9/1666 382/153
11,618,162 B2 * 4/2023 Cristache ............... B25J 9/1697 700/245
11,623,356 B2 * 4/2023 Vu .......................... F16P 3/142 700/259
11,625,085 B2 * 4/2023 Wood .................... G06F 1/3225 700/286
11,636,648 B2 * 4/2023 Mello ................... G06T 7/0004 700/259
11,646,808 B2 * 5/2023 Cella .................. G05B 19/4185 702/188
11,648,668 B2 * 5/2023 Cristache ................. B25J 9/162 700/250
11,648,685 B2 * 5/2023 Angle .................... B25J 13/006 701/2
11,657,531 B1 * 5/2023 Ebrahimi Afrouzi .. G06V 10/44 382/284
11,669,913 B2 * 6/2023 Cristache ................... B25J 9/08 700/245
11,697,203 B2 * 7/2023 Jung .................... G05D 1/0274 700/245
11,701,771 B2 * 7/2023 Mousavian ............ G06N 3/088 700/245
11,709,497 B2 * 7/2023 Artes ................... G05D 1/0016 701/23
11,731,273 B2 * 8/2023 Cristache ............. G06N 3/0442 700/250
11,740,634 B2 * 8/2023 Kleiner ................ G05D 1/0044 701/2
11,745,351 B2 * 9/2023 Cristache ............... G05D 1/648 700/245
11,774,944 B2 * 10/2023 Cella .................. G05B 19/4155 700/275
11,787,041 B2 * 10/2023 Choi .................... G05D 1/6486 700/248
11,940,808 B2 * 3/2024 Ni ....................... A47L 11/4011
12,016,502 B2 * 6/2024 Tang ......................... A47L 1/02
12,090,650 B2 * 9/2024 Romanov ........... A47L 11/4036
2002/0106144 A1 * 8/2002 Garverick .......... G02B 26/0841 700/56
2003/0083756 A1 * 5/2003 Hsiung ............ G05B 19/41875 700/28
2004/0010346 A1 * 1/2004 Stewart ................... G06F 3/016 700/255
2004/0107010 A1 * 6/2004 King ...................... G06Q 10/06 700/83
2004/0181303 A1 * 9/2004 Walmsley ............. G06F 21/554 700/121
2004/0204792 A1 * 10/2004 Taylor ................... A47L 9/2805 700/245

(56) References Cited

U.S. PATENT DOCUMENTS

2005/0010331 A1* 1/2005 Taylor .................. G05D 1/0274 318/568.12
2005/0171644 A1* 8/2005 Tani .................... G05D 1/0259 701/25
2006/0020369 A1* 1/2006 Taylor .................... A47L 9/009 318/568.12
2006/0136090 A1* 6/2006 Koromyslov ............ G08G 1/09 715/764
2006/0184264 A1* 8/2006 Willis ................ G05B 19/4184 700/110
2007/0005188 A1* 1/2007 Johnson ................ G06F 16/444 455/456.3
2007/0192910 A1* 8/2007 Vu ........................ B25J 9/0003 901/1
2008/0009964 A1* 1/2008 Bruemmer ........... G05D 1/0223 700/245
2008/0009965 A1* 1/2008 Bruemmer ............ G06N 3/008 701/23
2008/0009966 A1* 1/2008 Bruemmer ........... G05D 1/0274 700/245
2008/0009967 A1* 1/2008 Bruemmer ............ G06N 3/008 700/245
2008/0009968 A1* 1/2008 Bruemmer ............ G06N 3/008 700/245
2008/0009969 A1* 1/2008 Bruemmer ........... G05D 1/0027 700/245
2008/0009970 A1* 1/2008 Bruemmer ............ G06N 3/008 700/245
2008/0058106 A1* 3/2008 Audet .................. G06F 40/169 700/90
2009/0118846 A1* 5/2009 Eldridge ................... G06F 8/71 703/2
2010/0161101 A1* 6/2010 Pouyez .................. G06Q 10/10 709/202
2010/0305720 A1* 12/2010 Doll ..................... G05B 19/042 700/86
2010/0305721 A1* 12/2010 Kostadinov ........ G05B 19/0426 700/86
2011/0066262 A1* 3/2011 Kelly ................. G05B 23/0267 703/17
2011/0153136 A1* 6/2011 Anderson ............ G05D 1/0246 348/E7.086
2011/0194755 A1* 8/2011 Jeong ........................ G06T 7/77 901/1
2011/0313558 A1* 12/2011 Lehman .................. B24B 49/04 700/108
2011/0315441 A1* 12/2011 Balfour .................. H02G 7/053 248/65
2012/0065802 A1* 3/2012 Seeber .................. G06F 1/3203 700/295
2012/0066168 A1* 3/2012 Fadell .................. H05B 47/115 702/140
2012/0158200 A1* 6/2012 Vandevelde ............ H02J 13/12 700/292
2012/0158205 A1* 6/2012 Hinman ............. G05B 23/0216 700/297
2012/0169497 A1* 7/2012 Schnittman ............. A47L 9/106 340/540
2013/0060362 A1* 3/2013 Murphy ................ A63F 13/828 700/93
2013/0206177 A1* 8/2013 Burlutskiy .............. A47L 9/009 15/319
2013/0238151 A1* 9/2013 Vaum ........................ H02J 3/17 700/286
2014/0071240 A1* 3/2014 Chen ......................... G06T 7/70 348/46
2014/0100736 A1* 4/2014 Kim ....................... B25J 9/0003 15/49.1
2014/0207280 A1* 7/2014 Duffley ................ G05D 1/0016 700/257
2014/0207281 A1* 7/2014 Angle .................... B25J 13/006 700/257
2014/0207282 A1* 7/2014 Angle .................... B25J 13/006 901/1
2014/0343783 A1* 11/2014 Lee ...................... G05D 1/0011 701/25
2015/0032260 A1* 1/2015 Yoon .................... G05D 1/6486 700/257
2015/0142169 A1* 5/2015 Kim ..................... G05D 1/0238 15/98
2015/0153716 A1* 6/2015 Anderson .............. G05B 15/02 700/286
2015/0269438 A1* 9/2015 Samarasekera ......... G06F 18/24 382/154
2016/0022015 A1* 1/2016 Miller .................. A45D 44/005 700/265
2016/0103451 A1* 4/2016 Vicenti ............... A47L 11/4061 700/259
2016/0121479 A1* 5/2016 Lin ...................... G05D 1/0282 701/2
2016/0309973 A1* 10/2016 Sheikh ................. G05D 1/0274
2017/0071436 A1* 3/2017 Hofner ................ A47L 11/4011
2017/0090456 A1* 3/2017 Mao ..................... G05D 1/0246
2017/0215680 A1* 8/2017 Chang ................. A47L 11/4011
2017/0246739 A1* 8/2017 Frisby .................... B25J 13/006
2017/0273527 A1* 9/2017 Han ....................... B25J 13/006
2018/0020893 A1* 1/2018 Lee ....................... A47L 9/2852 701/28
2018/0074508 A1* 3/2018 Kleiner ................ G05D 1/6482
2018/0217611 A1* 8/2018 Kim ..................... G05D 1/6482
2018/0228333 A1* 8/2018 Wolfe ....................... A47L 9/28
2018/0344116 A1* 12/2018 Schriesheim ......... A47L 9/2826
2018/0360282 A1* 12/2018 Erkek .................. A47L 9/2847
2018/0364045 A1* 12/2018 Williams ................ G01S 17/88
2019/0133395 A1* 5/2019 Jung ..................... A47L 9/2805
2019/0212752 A1* 7/2019 Fong .................... G05D 1/6987
2020/0069140 A1* 3/2020 Orzechowski ....... G05D 1/0016
2020/0174485 A1* 6/2020 Liu ...................... G05D 1/0219
2020/0229669 A1* 7/2020 Arnold .................. A47L 7/0004
2020/0293060 A1* 9/2020 Jeong ................... G05D 1/0274
2020/0331148 A1* 10/2020 Zhang ................. A47L 11/4011
2020/0375429 A1* 12/2020 Munich ............... A47L 11/4061
2021/0124354 A1* 4/2021 Munich ................ G05D 1/0212
2021/0315430 A1* 10/2021 Li ........................ G05D 1/0219
2021/0321853 A1* 10/2021 He ...................... A47L 11/4061
2021/0369069 A1* 12/2021 Peng ..................... A47L 9/2826
2022/0022717 A1* 1/2022 Wu ..................... A47L 11/4011
2022/0047135 A1* 2/2022 Lee ..................... A47L 11/4061
2022/0079406 A1* 3/2022 Zhang ..................... A47L 11/28
2022/0095869 A1* 3/2022 Zhang ................... A47L 11/145
2022/0134537 A1* 5/2022 Chadalavada Vijay Kumar ......... B25J 9/163 700/250
2022/0134547 A1* 5/2022 Cristache ............... B25J 11/008 700/245
2022/0151450 A1* 5/2022 Case ...................... B25J 13/003
2022/0183528 A1* 6/2022 Zhang ................... A47L 9/2852
2022/0192453 A1* 6/2022 Mosebach ............. A47L 11/282
2022/0211241 A1* 7/2022 Zheng ................. A47L 11/4011
2022/0233043 A1* 7/2022 Mosebach ............. A47L 9/2852
2023/0084829 A1* 3/2023 Sung ................... A47L 11/4011 134/6
2023/0095317 A1* 3/2023 Reske ................... A47L 9/0477 15/319
2023/0123298 A1* 4/2023 Holson .................. B25J 9/1671 700/255
2023/0176557 A1* 6/2023 Cella .................... G05B 13/048 700/117
2023/0191635 A1* 6/2023 Vu .......................... F16P 3/144 700/259
2023/0202031 A1* 6/2023 Yang ...................... B25J 9/1612 700/259
2023/0255424 A1* 8/2023 Lee ....................... A47L 9/2826 134/6
2023/0259138 A1* 8/2023 Chen ...................... G06V 10/80 700/245
2023/0271320 A1* 8/2023 Dayeh .................... B25J 19/028 700/260

(56) References Cited

U.S. PATENT DOCUMENTS

2023/0271322 A1* 8/2023 Denenberg ............ G01S 7/4808 382/153
2023/0315186 A1* 10/2023 Wood .................... G06F 1/3225 700/286
2023/0404345 A1* 12/2023 Lim ........................ B25J 9/0003
2024/0041291 A1* 2/2024 Wu ....................... A47L 9/2831
2024/0119614 A1* 4/2024 Ebrahimi Afrouzi ........................ A47L 11/4011
2024/0122431 A1* 4/2024 Wang ...................... A47L 11/24
2024/0122435 A1* 4/2024 Wang .................. A47L 11/4011
2024/0292993 A1* 9/2024 Cong .................. A47L 11/4011
2024/0310851 A1* 9/2024 Ebrahimi Afrouzi ... G01S 17/87
2024/0326259 A1* 10/2024 Zhang ................. A47L 11/4011
2025/0072678 A1* 3/2025 Schnitzer .............. A47L 9/2826
2025/0143529 A1* 5/2025 Gong .................. A47L 11/4061
2025/0216867 A1* 7/2025 Cong .................. A47L 11/4011
2025/0315062 A1* 10/2025 Sun ...................... G05D 1/6486

* cited by examiner 401 build an obstacle information database 402 obtain a grid map of a target area, wherein the grid map includes at least one primary cleaning partition 403 determine whether a primary cleaning partition meeting a re-cleaning condition is present, if so, designate the primary cleaning partition meeting the re-cleaning condition as a re-cleaning partition, so as to obtain at least one re-cleaning partition, wherein the re-cleaning condition is that the primary cleaning partition is provided with an along-wall mark and is not filled up by a cleaning mark 404 determine whether a re-cleaning partition that a cleaning robot can reach is present in the at least one re-cleaning partition according to a preset obstacle information database, wherein the obstacle information database is configured to record real-time obstacle information identified during cleaning process 405 navigate to a target partition for cleaning if the re-cleaning partition that the cleaning robot can reach is present, wherein the target partition is the re-cleaning partition that the cleaning robot can reach with the shortest distance 406 determine whether navigation is successful when the navigation ends, wherein the navigation is successful means that the cleaning robot reaches an end of a planned navigation route;

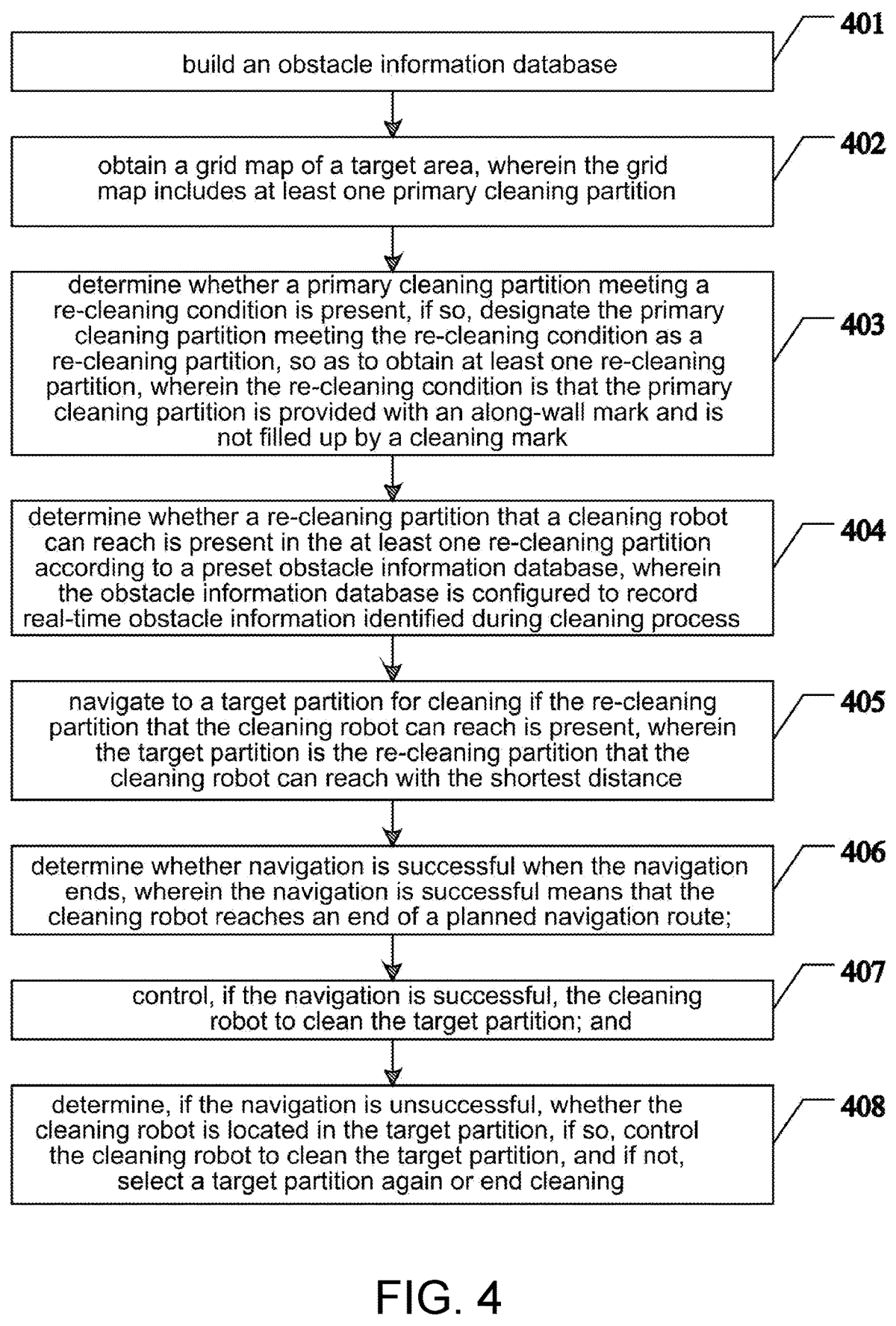

407 control, if the navigation is successful, the cleaning robot to clean the target partition; and 408 determine, if the navigation is unsuccessful, whether the cleaning robot is located in the target partition, if so, control the cleaning robot to clean the target partition, and if not, select a target partition again or end cleaning

FIG. 4

METHOD AND APPARATUS OF RE-CLEANING, CLEANING ROBOT, AND STORAGE MEDIUM

CROSS-REFERENCE TO RELATED APPLICATION

This application claims the priority benefit of China application serial no. 202210873679.X, filed on Jul. 21, 2022. The entirety of the above-mentioned patent application is hereby incorporated by reference herein and made a part of this specification.

TECHNICAL FIELD

The present disclosure relates to the technical field of smart home, and in particular to a method and an apparatus of re-cleaning, a cleaning robot, and a storage medium.

BACKGROUND ART

With the development of science and technology, some smart household devices have gradually entered the lives of the public, such as cleaning robots, which can help people reduce the burden of housework and maintain a good living environment.

In prior art, cleaning robots are designed to clean a designated area in zones and return to their charging dock, wherein if the cleaning robot encounters obstacles, such as a closed door, a moving person or pet, and a wall of a narrow entrance, during working, it may leave current zone and go to next zone for cleaning. However, the current partition is not yet cleaned completely, and the cleaning robot returns to the position of the charging stand after cleaning of other partitions is completed, so that re-cleaning will not be performed on the partition that has not been cleaned completely, which causes a case that cleaning is missed in part of the area and leads to low cleaning quality.

BRIEF DESCRIPTION OF DRAWINGS

FIG. 4 is a schematic diagram of another embodiment of a method of re-cleaning according to an embodiment of the present disclosure;

DETAILED DESCRIPTION OF EMBODIMENTS

Embodiments of the present disclosure provide a method and an apparatus of re-cleaning, a cleaning robot, and a storage medium, wherein a re-cleaning partition is found according to a re-cleaning conditions, and the cleaning robot navigates to the re-cleaning partition that can be reached and is closest to the cleaning robot for cleaning, so that the cleaning efficiency and the cleaning quality are improved.

In the description, claims, and accompanying drawings of the present disclosure, the terms "first", "second", "third", "fourth", and so on (if any) are intended to distinguish between similar objects but do not necessarily indicate a specific order or sequence. It should be understood that the data termed in such a way are interchangeable in proper circumstances, so that embodiments described herein can be implemented in other orders than the order illustrated or described herein. Moreover, the terms "include" or "have" and any variant thereof are intended to cover a non-exclusive inclusion. For example, a process, method, system, product, or device that includes a list of steps or units is not necessarily limited to those steps or units that are expressly listed, but may include other steps or units not expressly listed or are inherent to the process, method, product, or device.

For ease of understanding, the following describes a specific process of an embodiment of the present disclosure, and the present disclosure is performed by a cleaning robot, which includes a floor sweeping robot, a floor mopping robot, a vacuuming robot, or other robots with floor cleaning functions.

Figure 1:
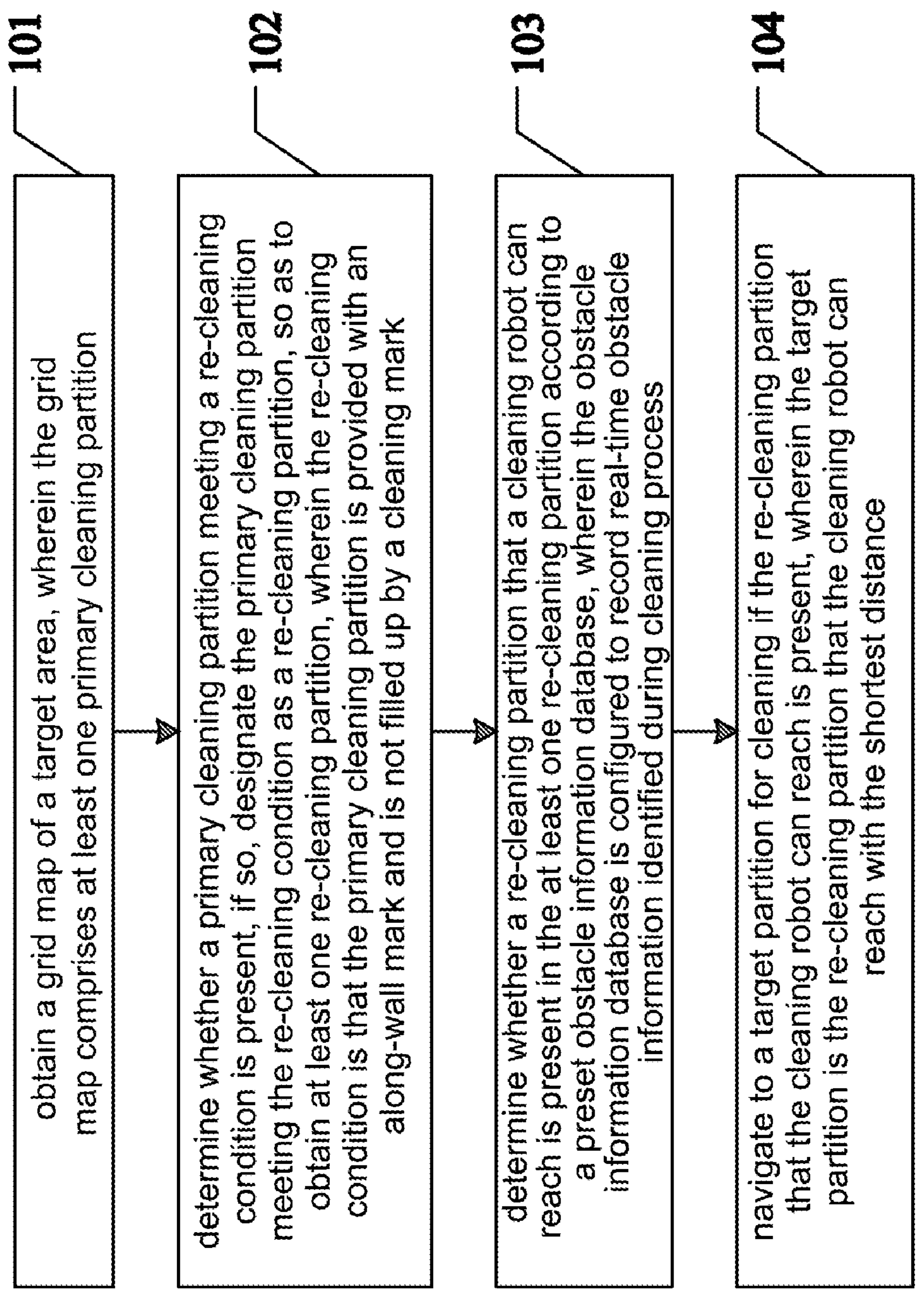
FIG. 1 is a schematic diagram of an embodiment of a method of re-cleaning according to an embodiment of the present disclosure.
Figure 2:
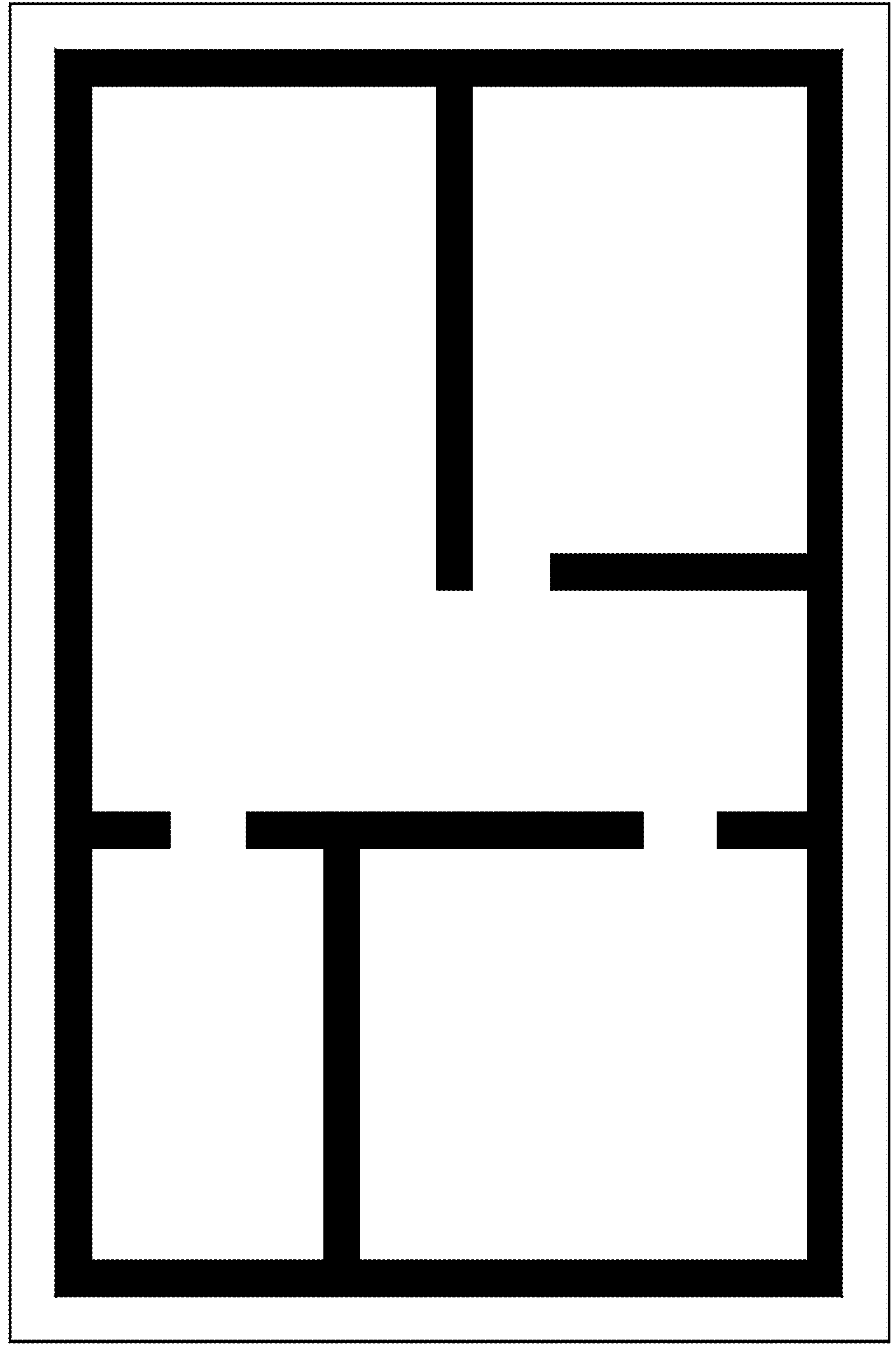
FIG. 2 is a simplified schematic diagram of a grid map according to an embodiment of the present disclosure.

Referring to FIG. 1, an embodiment of a method of re-cleaning according to an embodiment of the present disclosure includes:

101: Obtaining a grid map of a target area, wherein the grid map includes at least one primary cleaning partition;

herein, the grid map is a digitized image established by a cleaning robot based on an indoor real environment during the cleaning process, a minimum unit in the grid map is a grid, and each grid corresponds to one area of the indoor real environment. The cleaning robot gives a gray value to each grid, and whether an actual environment corresponding to the grid is occupied by obstacles is determined according to the gray value, wherein the obstacles include a wall body, an electric appliance cabinet body, and furniture. As shown in FIG. 2, common gray values are 0 and 255, wherein 0 represents black, which is used to indicate that an area is occupied by obstacles, and 255 represents white, which is used to indicate that an area is not occupied by obstacles.

The cleaning robot partitions the unoccupied area in the grid map, and in addition to partitioning according to a room, a partitioning rule is further provided, wherein the cleaning robot identifies unoccupied grids at an uppermost end, a lowermost end, a leftmost end and a rightmost end in the grid map, generates a first horizontal line passing through the uppermost grid and a second horizontal line passing through the lowermost grid, a first vertical line passing through the leftmost grid and a second vertical line passing through the rightmost grid, cuts a closed area surrounded by the first horizontal line, the second horizontal line, the first vertical line and the second vertical line in a transverse direction and in a longitudinal direction, and then obtains a minimum partition as a primary cleaning partition, wherein each primary cleaning partition includes unoccupied grids. In order to avoid a case that the number of the primary cleaning partitions is too large due to the large number of the cuttings, the number of the transverse and longitudinal cuttings can be determined based on actual length and width of the closed area, the closed area is equally divided and cut in length and width dimensions based on the number of the transverse and longitudinal cuttings, and a plurality of primary cleaning partitions are obtained after cutting. A solution for counting the number of cuttings is provided here: M1 and M2 are a length and a width of a closed area, respectively, N1 and N2 are a preset length and width, respectively, M1≥N1, M2≥N2, the number of transverse cuttings K1 of the closed area is taken as an integer part of M1/N1, and the number of longitudinal cuttings K2 of the closed area is taken as an integer part of M2/N2. The desired number of primary cleaning partitions is obtained by this partitioning rule through adjusting the preset length and width values. When a target area is very large and a length of the target area is far larger than a width or a width of the target area is far larger than a length, the target area can be divided into partitions with an appropriate number and size, wherein the appropriate number enables the cleaning robot to more accurately locate a position at which the cleaning robot is positioned when the last cleaning is interrupted during the re-cleaning, which avoids a phenomenon that the cleaned area is cleaned again or the un-cleaned area is not cleaned due to inaccurate positioning; and the appropriate size can avoid a case that the cleaning robot cannot enter due to narrow partitions, improve the positioning accuracy of the cleaning robot, and improve the cleaning quality of the target area. When the length and width of the target area are not greatly different, the preset length and width can be set to be the same or close values, so that the number of transverse cuttings of the target area is equal to the number of longitudinal cuttings of the target area, and the target area is equally divided in length and width dimensions.

Figure 3:
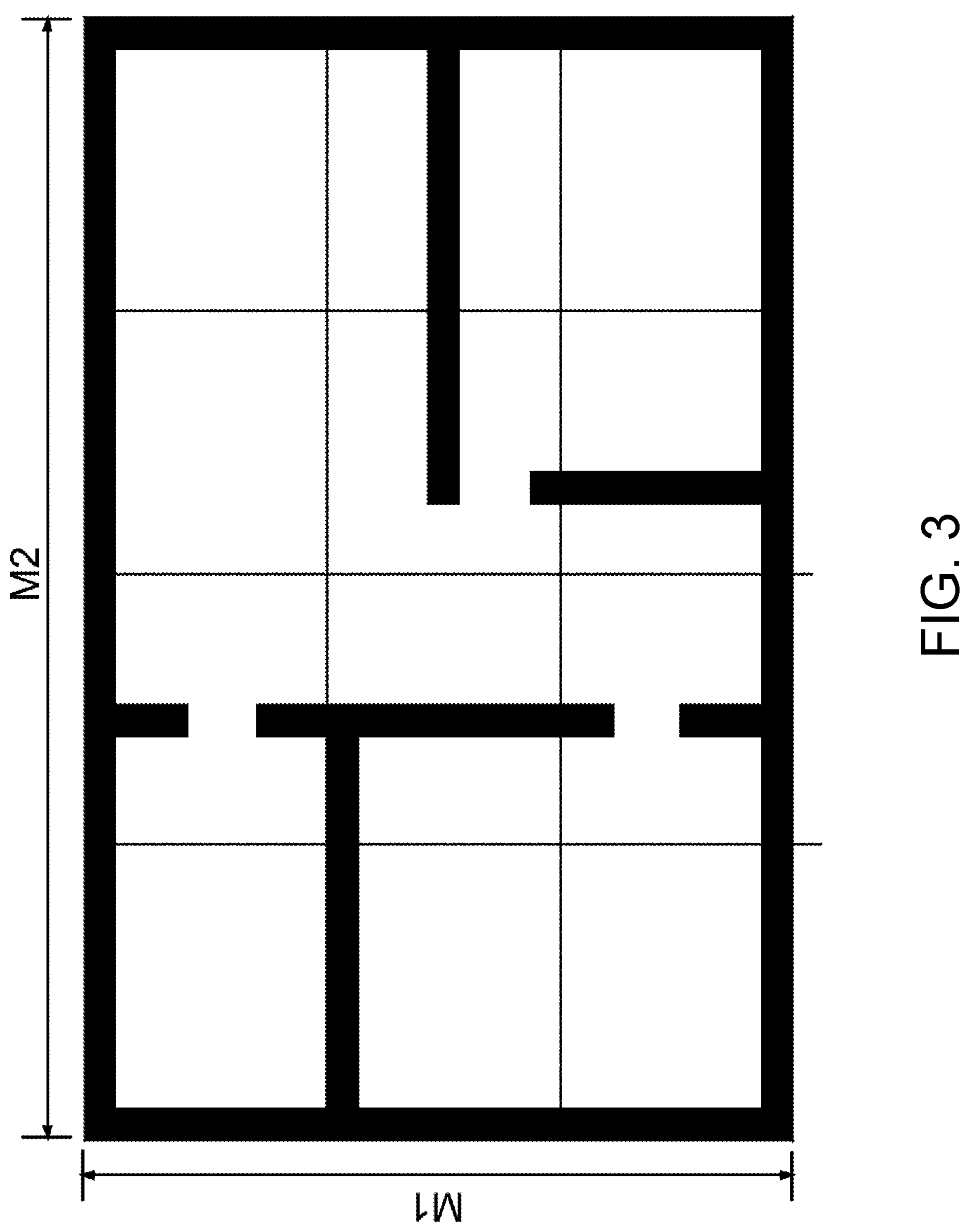
FIG. 3 is a schematic diagram of an embodiment of a grid map partition according to an embodiment of the present disclosure.

For example, when the length and width of the closed area are 13.2 meters and 10 meters, respectively, and the preset length and width are 5 meters and 3 meters, respectively, M1/N1=2.64, M2/N2=3.33, then K1=2, and K2=3. The closed area is cut 2 times in a length direction, that is, the closed area will be equally divided into 3 parts in the length direction of the closed area; similarly, the closed area is cut 3 times in a width direction of the closed area, that is, the closed area will be equally divided into 4 parts in the width direction of the closed area, and finally the closed area is divided into 12 primary cleaning partitions, as shown in FIG. 3.

102: Determining whether a primary cleaning partition meeting a re-cleaning condition is present, if so, designating the primary cleaning partition meeting the re-cleaning condition as a re-cleaning partition to obtain at least one re-cleaning partition, wherein the re-cleaning condition is that the primary cleaning partition is provided with an along-wall mark and is not filled up by a cleaning mark; and a cleaning mode of the cleaning robot includes along-edge cleaning and area cleaning. Herein, the along-edge cleaning refers to cleaning along an edge of a primary cleaning partition, and when the cleaning robot performs along-edge cleaning, the along-wall marks are added in the grid map at intervals of a preset time or a preset traveling distance. The area cleaning refers to cleaning in a zigzag path within an area surrounded by markings along the wall, when the cleaning robot performs area cleaning, the cleaning marks are added in the grid map at intervals of preset time or a preset traveling distance. The along-wall marks and the cleaning marks can be marks with two different colors or two different shapes. In each primary cleaning partition, the cleaning robot performs the along-edge cleaning first, followed by the area cleaning.

The cleaning robot scans each primary cleaning partition on the grid map, and if any one of the following three cases occurs in the primary cleaning partition, the primary cleaning partition is designated as a re-cleaning partition:

1) a part of edges of the primary cleaning partition are provided with along-wall marks;
2) all edges of the primary cleaning partition are provided with along-wall marks, however, the primary cleaning partition is not provided with cleaning marks; and
3) all edges of the primary cleaning partition are provided with along-wall marks, and the primary cleaning partition is provided with cleaning marks, however, the primary cleaning partition is not filled with the cleaning marks.

For example, the target area has 5 primary cleaning partitions, wherein only a part of edges of the primary cleaning partition 1 are provided with along-wall marks; all edges of the primary cleaning partition 2 are provided with along-wall marks, and this partition is filled with cleaning marks; all edges of the primary cleaning partition 3 are provided with along-wall marks, however, this partition is not provided with cleaning marks; a part of edges of the primary cleaning partition 4 are provided with along-wall marks, however, this partition is not filled with cleaning marks; and all edges of the primary cleaning partition 5 are provided with along-wall marks, however, this partition is not filled with cleaning marks. Therefore, the primary cleaning partition 1, the primary cleaning partition 3, the primary cleaning partition 4, and the primary cleaning partition 5 are designating as re-cleaning partitions.

103: Determining whether a re-cleaning partition that a cleaning robot can access is present in the at least one re-cleaning partition according to a preset obstacle information database, wherein the obstacle information database is configured to record real-time obstacle information identified during the cleaning process; and recording the real-time obstacle information detected by the cleaning robot through a laser radar or an infrared sensor during the movement in the obstacle information database, wherein an obstacle is an object appearing at an unoccupied position in a grid map; when the cleaning robot senses the obstacle, determining whether the obstacle has already been recorded in the obstacle information database, if not, obtaining a position of the obstacle, starting a camera to take pictures of the obstacle and the surrounding environment, recording the position of the obstacle, the picture of the obstacle, the picture of the surrounding environment of the obstacle, and a state of the obstacle in the obstacle information database, and setting the state of the obstacle to be “present”; and when the cleaning robot identifies that the obstacle recorded in the obstacle information database is not located at an original position, setting the state of the obstacle to be “absent”.

The cleaning robot obtains a position point of the cleaning robot and a candidate point of each re-cleaning partition that is closest to the cleaning robot, so as to obtain a candidate navigation route to each re-cleaning partition according to the position point and the candidate point of each re-cleaning partition. A preset obstacle information database is invoked, and whether an obstacle is present on each candidate navigation route is inquired. If an obstacle is present on a target candidate navigation route, the cleaning robot cannot reach the re-cleaning partition corresponding to the target candidate navigation route; and if an obstacle is absent on a target candidate navigation route, the cleaning robot can reach the re-cleaning partition corresponding to the target candidate navigation route.

It should be additionally noted that there are three reasons for the re-cleaning partition, the first reason is that a dynamic obstacle is at an entrance; the second reason is that a low obstacle is near the entrance or on the edge, due to the hardware structure, the laser radar cannot identify the low obstacle, and the low obstacle is identified as an occupied area on the grid map, so that the entrance becomes smaller, resulting in the same situation as the third situation; and the third reason is that the entrance is narrow, and a size of the entrance is the same as or slightly larger than a diameter of the cleaning robot, due to a movement control error of the cleaning robot, sometimes the cleaning robot cannot pass through the entrance. When a candidate point of the re-cleaning partition is at an entrance, the cleaning robot reaches the entrance; and when the candidate point of the re-cleaning partition is at a non-entrance, the cleaning robot passes through the entrance, so that a necessary condition for determining whether the cleaning robot can reach the entrance of the re-cleaning partition is that there is no obstacle at the entrance of the re-cleaning partition. If the obstacle is present in the target candidate navigation route but it is not at the entrance, then whether another obstacle-free navigation route is present between the cleaning robot and the target re-cleaning partition corresponding to the target candidate navigation route is determined again, and if so, this obstacle-free navigation route is taken as a new candidate navigation route of the target re-cleaning partition.

For example, the target area has 4 re-cleaning partitions: a re-cleaning partition 1, a re-cleaning partition 2, a re-cleaning partition 3, and a re-cleaning partition 4. The cleaning robot plans navigation routes to 4 re-cleaning partitions to obtain corresponding candidate navigation route 1, candidate navigation route 2, candidate navigation route 3, and candidate navigation route 4. A preset obstacle information database is invoked to inquire whether an obstacle is present on the 4 candidate navigation routes. After inquiry, an obstacle is absent on the candidate navigation route 1 and the candidate navigation route 2, and an obstacle is present on the candidate navigation route 3 and the candidate navigation route 4, however, the obstacle on the candidate navigation route 3 is at an entrance of the re-cleaning partition 3, and the obstacle on the candidate navigation route 4 is not at the entrance of the re-cleaning partition 4. The cleaning robot determines whether an obstacle-free navigation route to the re-cleaning partition 4 is present. After determination, an obstacle-free navigation route 4 is present, and the obstacle-free navigation route 4 is taken as a new candidate navigation route 4. Therefore, the re-cleaning partition 1, the re-cleaning partition 2, and the re-cleaning partition 4 are the re-cleaning partitions that the cleaning robot can reach.

104: If the re-cleaning partition that the cleaning robot can reach is present, the cleaning robot navigates to the target partition for cleaning, wherein the target partition is the re-cleaning partition that the cleaning robot can reach with the shortest distance.

A re-cleaning partition that the cleaning robot can reach is referred to as a reachable re-cleaning partition. The cleaning robot screens a candidate point on each reachable re-cleaning partition that is closest to the cleaning robot, and calculates a distance between each candidate point and the cleaning robot in various modes, such as a Euclidean distance, a navigation distance, or a Manhattan distance. Preferably, the Manhattan distance between each candidate point and the cleaning robot is calculated herein to obtain at least one Manhattan distance. When only one Manhattan distance is present, the reachable re-cleaning partition corresponding to the unique Manhattan distance is taken as a target partition, and the cleaning robot navigates to the target partition for cleaning; when two or more Manhattan distances are present, the reachable re-cleaning partition corresponding to the shortest Manhattan distance is selected as a target partition, and the cleaning robot navigates to the target partition for cleaning.

Two candidate point selection modes are provided, where the first mode is that a cleaning robot is taken as a center, all points on a grid map are scanned by adopting a breadth first search (BFS) algorithm, and the first scanned point belonging to a target reachable re-cleaning partition is taken as a candidate point of the target reachable re-cleaning partition; and the second mode is that the cleaning robot sends sound wave signals or light signals to a target reachable re-cleaning partition for detection, and a point corresponding to the first received feedback signals is taken as a candidate point of the target reachable re-cleaning partition.

In embodiments of the present disclosure, a partition that needs re-cleaning is identified from a primary cleaning partition according to the re-cleaning condition, so that a missed area that has not been cleaned yet is avoided, and a re-cleaning partition that the cleaning robot can reach and is closest to the cleaning robot is selected, so that the cleaning efficiency is improved; and the cleaning robot performs the area cleaning after reaching the re-cleaning partition, so that the cleaning quality of the target area is improved.

Referring to FIG. 4, another embodiment of a method of re-cleaning according to an embodiment of the present disclosure includes:

401: Building an obstacle information database;

establishing an obstacle information database, wherein the obstacle information database is configured to record real-time obstacle information identified by the cleaning robot during the cleaning process, and the obstacle information includes a position of an obstacle, a picture of an obstacle, a surrounding environment picture of an obstacle, and a state of an obstacle. When the cleaning robot identifies a newly added obstacle, a position of the obstacle is obtained, a camera is started to take pictures of the obstacle and the surrounding environment, a state of the newly added obstacle is set to be "present", the position of the obstacle, the picture of the obstacle, the picture of the surrounding environment of the obstacle, and the state of the obstacle are recorded in the obstacle information database, and a rule for determining whether an added new obstacle is present is that an obstacle is detected at an unoccupied position in the grid map and the obstacle is not recorded in the obstacle information database. When the cleaning robot identifies that a position of a target obstacle recorded in the obstacle information database has changed, the information of the target obstacle in the obstacle information database is updated, wherein the updated content may be the update of the target obstacle state or the deletion of the target obstacle information, for example, when the cleaning robot identifies that the target obstacle is not located at an original position, the state of the target obstacle may be set to be "absent", or the information of the target obstacle may be deleted from the obstacle information database.

Furthermore, a fixed obstacle that is misdetermined as a dynamic obstacle is present in the obstacles, for example, newly-added articles with low moving frequency such as cabinets or sofas block part of the room entrance due to the size or space limitation. Therefore, in order to ensure the accuracy of the obstacle information database, it is necessary to track the obstacles identified by the cleaning robot, and add a counter to each obstacle recorded in the obstacle information database, wherein the initial value of the counter is set to 0. The obstacle information database is updated by a sensor during the moving process of the cleaning robot, and the cleaning robot sensor includes a laser radar, an infrared sensor, or a camera. If the obstacle is not located at an original position, the state of the obstacle is set to be "absent", or the information of the obstacle is deleted. If the obstacle is still located at the original position, the state of the obstacle is kept to be "present", the counter of the obstacle is added by 1, and each obstacle with a "present" state is monitored. When the value displayed on the counter of the obstacle is greater than a set value, the obstacle is determined as a fixed obstacle, the grid map is updated, and the information of the fixed obstacle in the obstacle information database is deleted.

For example, the set value is 30, the cleaning robot identifies new obstacle A and obstacle B on the first day of cleaning, the states of the two obstacles are set to be "present", the information of the obstacle A and the information of the obstacle B are recorded in the obstacle information database, and counters with an initial value of 0 are added to the obstacle A and the obstacle B. On the second day of cleaning, the cleaning robot detects that obstacle A is not located at the recorded position, and obstacle B is still located at the recorded position, so that the state of the obstacle A is set to be "absent", and the counter of the obstacle B is increased by 1. After a period of time, the value on the obstacle B counter is 31, which is greater than the set value, so that the obstacle B is determined as a fixed obstacle, a grid of a position where the obstacle B is located in the grid map is updated into an occupied state, and the information of the obstacle B in the obstacle information database is deleted.

402: Obtaining a grid map of a target area, wherein the grid map includes at least one primary cleaning partition;

herein, the grid map is a digitized image established by a cleaning robot based on an indoor real environment during the cleaning process, a minimum unit in the grid map is a grid, and each grid corresponds to one area of the indoor real environment. The cleaning robot gives a gray value to each grid, and whether an actual environment corresponding to the grid is occupied by obstacles is determined according to the gray value, wherein the obstacles include a wall body, an electric appliance cabinet body, and furniture. For example, the common gray values are 0 and 255, wherein 0 represents black, which is used to indicate that an area is occupied by obstacles, and 255 represents white, which is used to indicate that an area is not occupied by obstacles.

The cleaning robot partitions the unoccupied area in the grid map, and in addition to partitioning according to a room, a partitioning rule is further provided, wherein the cleaning robot identifies unoccupied grids at an uppermost end, a lowermost end, a leftmost end and a rightmost end in the grid map, generates a first horizontal line passing through the uppermost grid and a second horizontal line passing through the lowermost grid, a first vertical line passing through the leftmost grid and a second vertical line passing through the rightmost grid, cuts a closed area surrounded by the first horizontal line, the second horizontal line, the first vertical line and the second vertical line in a transverse direction and in a longitudinal direction, and then obtains a minimum partition as a primary cleaning partition, wherein each primary cleaning partition includes unoccupied grids. In order to avoid a case that the number of the primary cleaning partitions is too large due to the large number of the cuttings, the number of the transverse and longitudinal cuttings can be determined based on actual length and width of the closed area, the closed area is equally divided and cut in length and width dimensions based on the number of the transverse and longitudinal cuttings, and a plurality of primary cleaning partitions are obtained after cutting. A solution for counting the number of cuttings is provided here: M1 and M2 are a length and a width of a closed area, respectively, N1 and N2 are a preset length and width, respectively, M1≥N1, M2≥N2, the number of transverse cuttings K1 of the closed area is taken as an integer part of M1/N1, and the number of longitudinal cuttings K2 of the closed area is taken as an integer part of M2/N2. The desired number of primary cleaning partitions is obtained by this partitioning rule through adjusting the preset length and width values. When a target area is very large and a length of the target area is far larger than a width or a width of the target area is far larger than a length, the target area can be divided into partitions with an appropriate number and size, wherein the appropriate number enables the cleaning robot to more accurately locate a position at which the cleaning robot is positioned when the last cleaning is interrupted during the re-cleaning, which avoids a phenomenon that the cleaned area is cleaned again or the un-cleaned area is not cleaned due to inaccurate positioning; and the appropriate size can avoid a case that the cleaning robot cannot enter due to narrow partitions, improve the positioning accuracy of the cleaning robot, and improve the cleaning quality of the target area. When the length and width of the target area are not greatly different, the preset length and width can be set to be the same or close values, so that the number of transverse cuttings of the target area is equal to the number of longitudinal cuttings of the target area, and the target area is equally divided in length and width dimensions.

For example, when the length and width of the closed area are 13.2 meters and 10 meters, respectively, and the preset length and width are 5 meters and 3 meters, respectively, M1/N1=2.64, M2/N2=3.33, then K1=2, and K2=3. The closed area is cut 2 times in a length direction, that is, the closed area will be equally divided into 3 parts in the length direction of the closed area; similarly, the closed area is cut 3 times in a width direction of the closed area, that is, the closed area will be equally divided into 4 parts in the width direction of the closed area, and finally the closed area is divided into 12 primary cleaning partitions.

Figure 5:
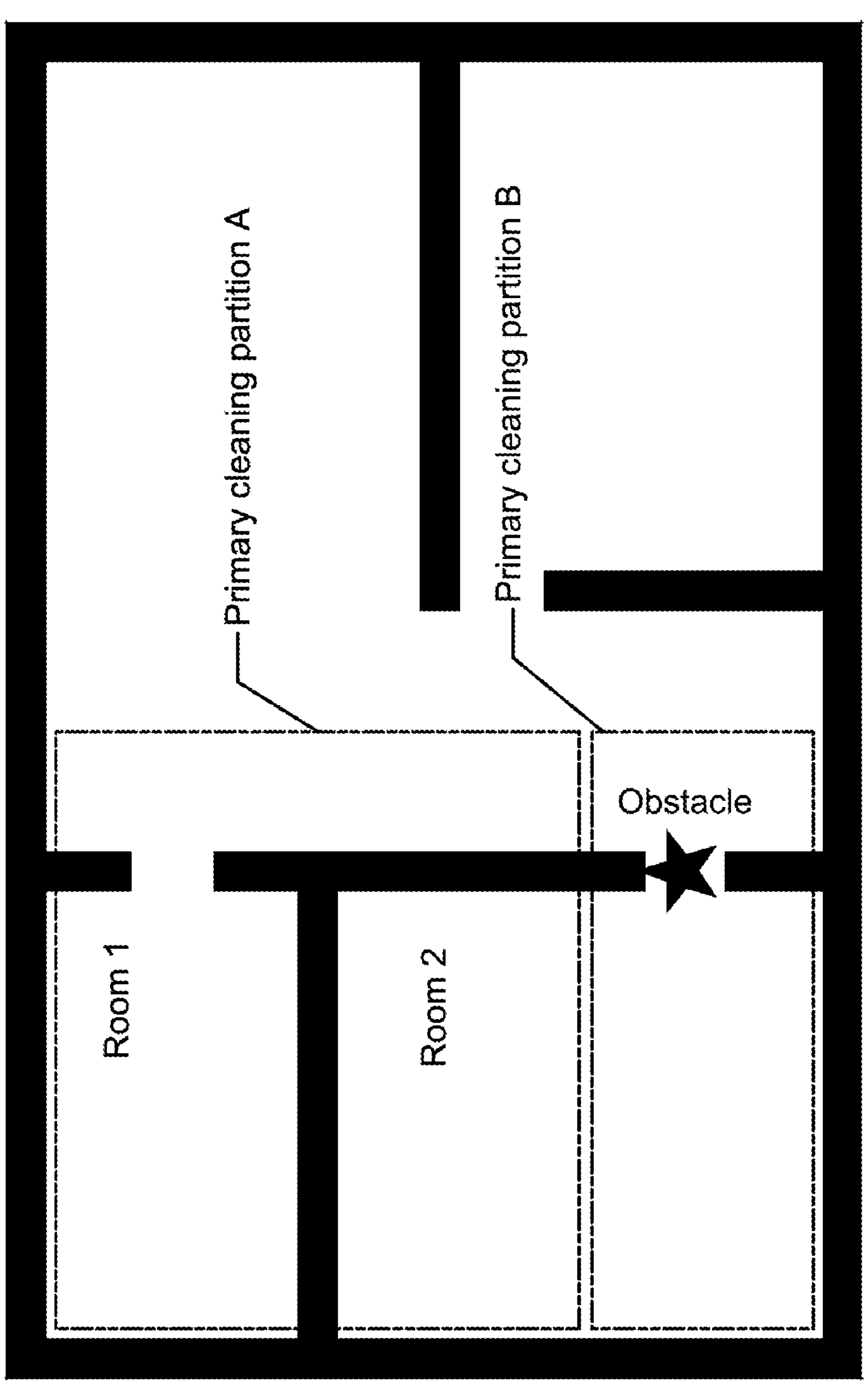
FIG. 5 is a schematic diagram of a first re-cleaning partition generation scenario according to an embodiment of the present disclosure.
Figure 6:
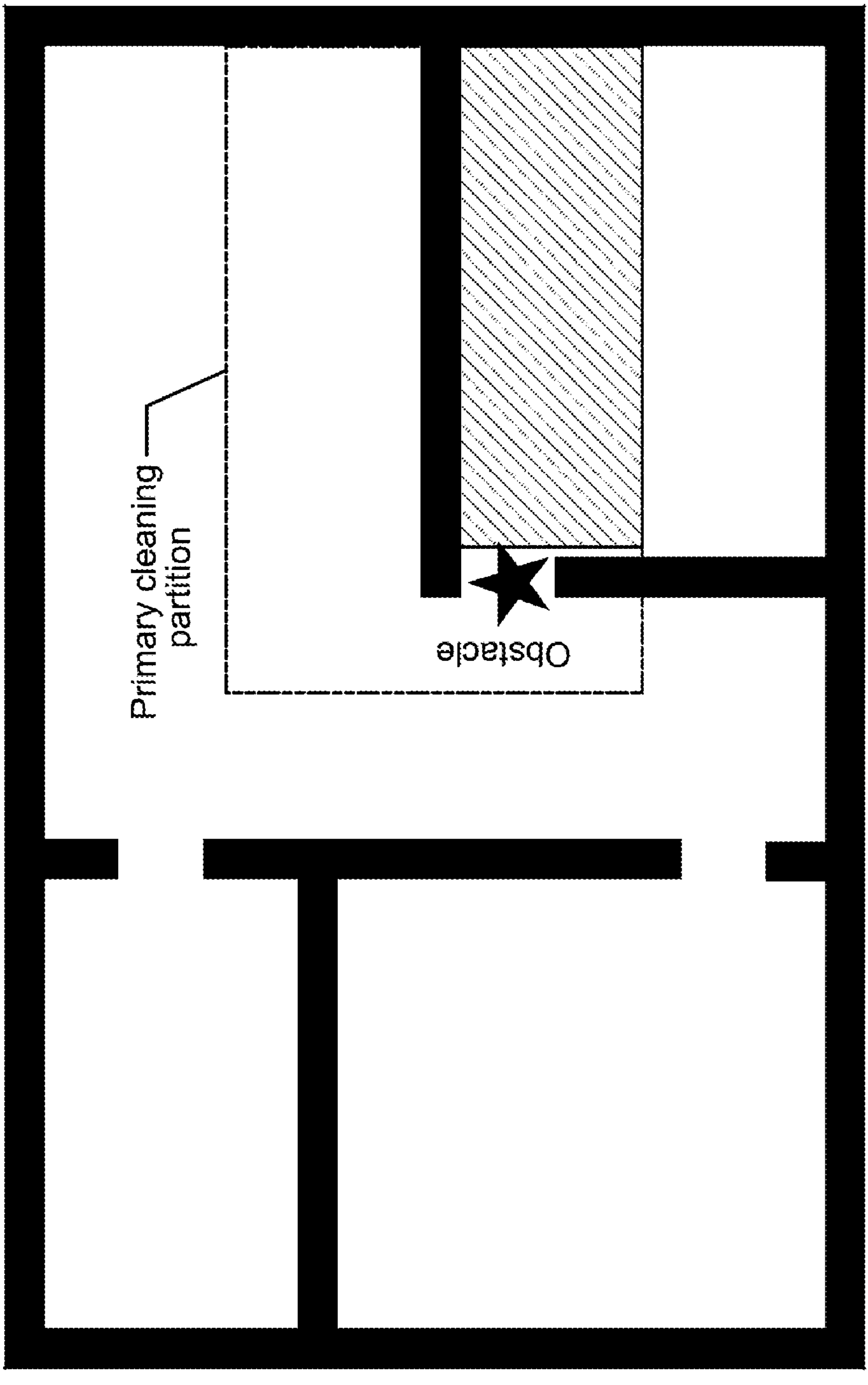
FIG. 6 is a schematic diagram of a second re-cleaning partition generation scenario according to an embodiment of the present disclosure.
Figure 7:
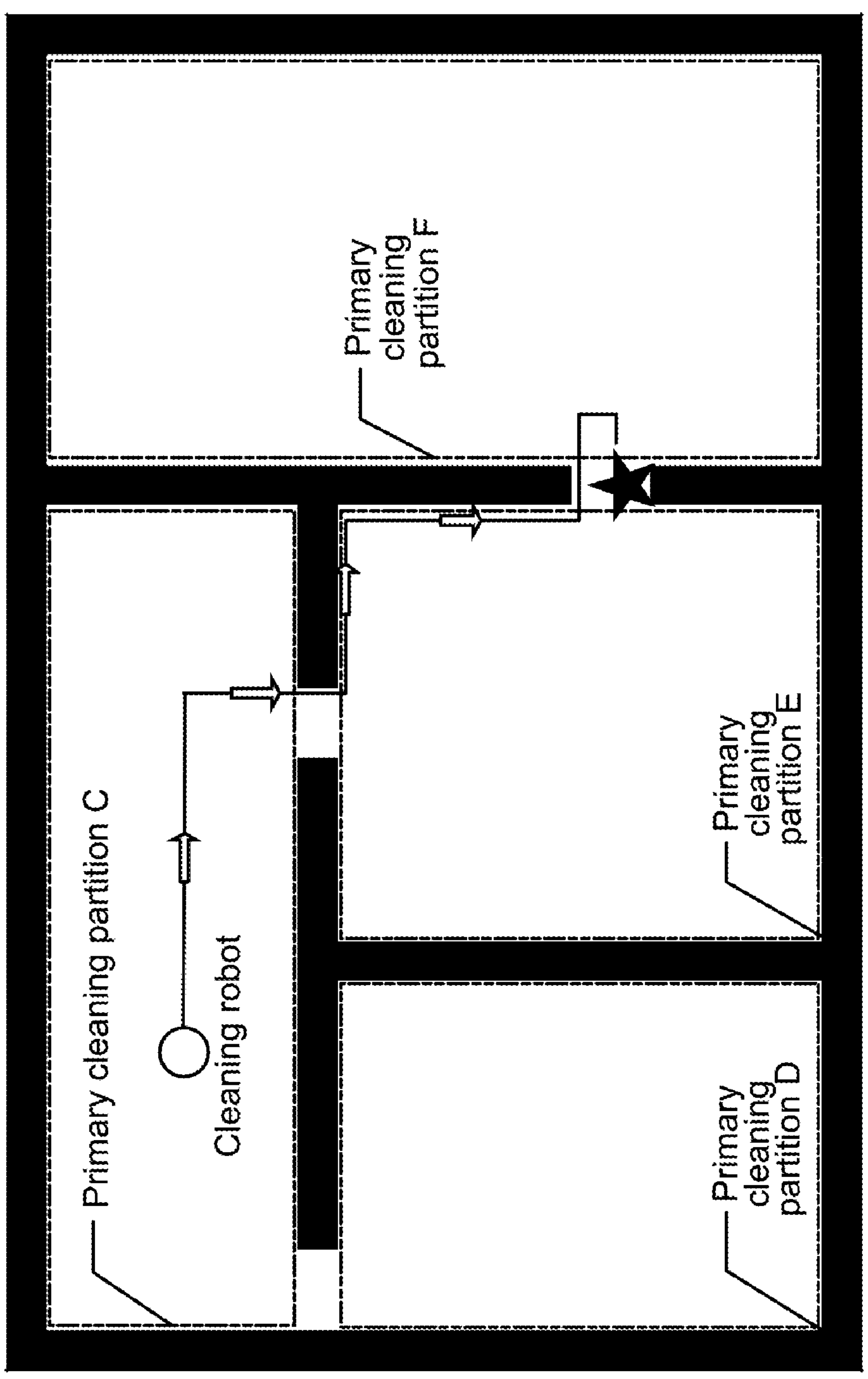
FIG. 7 is a schematic diagram of a third re-cleaning partition generation scenario according to an embodiment of the present disclosure.

403: Determining whether a primary cleaning partition meeting a re-cleaning condition is present, if so, the primary cleaning partition meeting the re-cleaning condition is designated as a re-cleaning partition to obtain at least one re-cleaning partition, wherein the re-cleaning condition is that the primary cleaning partition is provided with an along-wall mark and is not filled up by a cleaning mark; and there are three re-cleaning partition generation scenarios as follows:

1) When partition is performed by the cleaning robot, and a room is divided into different primary cleaning partitions, one of the primary cleaning partitions is subjected to an along-edge cleaning, wherein the doorway of the room is blocked by a dynamic obstacle during the cleaning process, so that the rest part of the room cannot be cleaned, but the cleaning robot has been to the room for cleaning. As shown in FIG. 5, the room 2 is divided into two different primary cleaning partitions, when the primary cleaning partition A is completely cleaned, the primary cleaning partition B of the room 2 has not been cleaned; however, the doorway is blocked, so that the cleaning robot cannot enter, and it cleans other areas first, consequently, the primary cleaning partition B of the room 2 is missed to be cleaned.
2) When a narrow area such as a doorway is included in the primary cleaning partition, a dynamic obstacle blocks the doorway after the cleaning robot performs along-wall cleaning in the current area, so that a part of areas in the primary cleaning partition are missed to be cleaned. As shown in FIG. 6, the doorway is blocked by the obstacle after the along-wall cleaning, consequently, an internal diagonal line area in the current primary cleaning partition is missed to be cleaned.
3) When the cleaning robot navigates, the cleaning robot has once passed an area along the edge, however, the area is missed to be cleaned because the doorway is blocked by an obstacle. As shown in FIG. 7, when the cleaning robot is in the primary cleaning partition C and wants to navigate to a certain point of the primary cleaning partition F, wherein a primary cleaning partition E is passed through, after the cleaning robot completes the cleaning of the primary cleaning partition F and then navigates to the primary cleaning partition E for cleaning, the doorways of the primary cleaning partition F and the primary cleaning partition E are blocked, so that the primary cleaning partition E is missed to be cleaned.

A cleaning mode of the cleaning robot includes along-edge cleaning and area cleaning. Herein, the along-edge cleaning refers to cleaning along an edge of a primary cleaning partition, and when the cleaning robot performs along-edge cleaning, the along-wall marks are added in the grid map at intervals of a preset time or a preset traveling distance. The area cleaning refers to cleaning in a zigzag path within an area surrounded by markings along the wall, when the cleaning robot performs area cleaning, the cleaning marks are added in the grid map at intervals of preset time or a preset traveling distance. The along-wall marks and the cleaning marks can be marks with two different colors or two different shapes. In each primary cleaning partition, the cleaning robot performs the along-edge cleaning first, followed by the area cleaning.

The cleaning robot scans each primary cleaning partition on the grid map, and if any one of the following three cases occurs in the primary cleaning partition, the primary cleaning partition is designating as a re-cleaning partition:

1) a part of edges of the primary cleaning partition are provided with along-wall marks;
2) all edges of the primary cleaning partition are provided with along-wall marks, however, the primary cleaning partition is not provided with cleaning marks; and
3) all edges of the primary cleaning partition are provided with along-wall marks, and the primary cleaning partition is provided with cleaning marks, however, the primary cleaning partition is not filled with the cleaning marks.

For example, the target area has 5 primary cleaning partitions, wherein only a part of edges of the primary cleaning partition 1 are provided with along-wall marks; all edges of the primary cleaning partition 2 are provided with along-wall marks, and this partition is filled with cleaning marks; all edges of the primary cleaning partition 3 are provided with along-wall marks, however, this partition is not provided with cleaning marks; a part of edges of the primary cleaning partition 4 are provided with along-wall marks, however, this partition is not filled with cleaning marks; and all edges of the primary cleaning partition 5 are provided with along-wall marks, however, this partition is not filled with cleaning marks. Therefore, the primary cleaning partition 1, the primary cleaning partition 3, the primary cleaning partition 4, and the primary cleaning partition 5 are designating as re-cleaning partitions.

Figure 8:
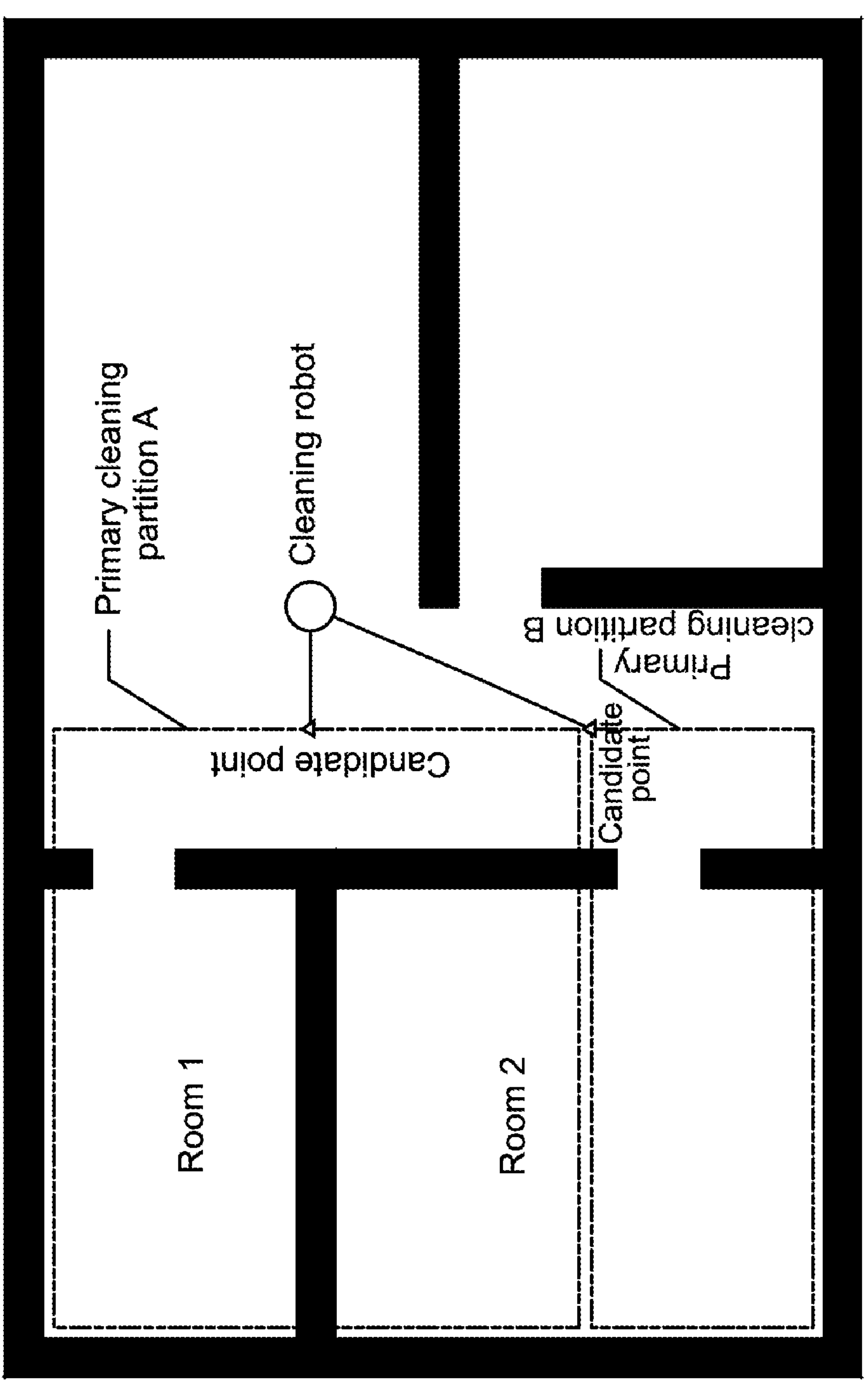
FIG. 8 is a schematic diagram of a candidate point of a re-cleaning partition according to an embodiment of the present disclosure.

404: Determining whether a re-cleaning partition that a cleaning robot can reach is present in the at least one re-cleaning partition according to a preset obstacle information database, wherein the obstacle information database is configured to record real-time obstacle information identified during the cleaning process; and determining at least one candidate point according to a current position point of the cleaning robot, wherein the candidate point is a contour point with the shortest straight-line distance between the re-cleaning partition and the current position point; as shown in FIG. 8, planning a navigation route from the current position point to each candidate point to obtain at least one navigation route, invoking a preset obstacle information database to inquire real-time obstacle information on the at least one candidate navigation route, so as to obtain information of an obstacle with a state of "present", determining whether at least one obstacle-free navigation route is present in the at least one candidate navigation route according to the obstacle information present on the at least one candidate navigation route, and if so, a re-cleaning partition corresponding to the at least one obstacle-free navigation route is designated as a re-cleaning partition that the cleaning robot can reach.

It should be additionally noted that there are three reasons for the re-cleaning partition, the first reason is that a dynamic obstacle is at an entrance; the second reason is that a low obstacle is near the entrance or on the edge, due to the hardware structure, the laser radar cannot identify the low obstacle, and the low obstacle is identified as an occupied area on the grid map, so that the entrance becomes smaller, resulting in the same situation as the third situation; and the third reason is that the entrance is narrow, and a size of the entrance is the same as or slightly larger than a diameter of the cleaning robot, due to a movement control error of the cleaning robot, sometimes the cleaning robot cannot pass through the entrance. When a candidate point of the re-cleaning partition is at an entrance, the cleaning robot reaches the entrance; and when the candidate point of the re-cleaning partition is at a non-entrance, the cleaning robot passes through the entrance, so that a necessary condition for determining whether the cleaning robot can reach the entrance of the re-cleaning partition is that there is no obstacle at the entrance of the re-cleaning partition. If the obstacle is present in the target candidate navigation route but it is not at the entrance, whether another obstacle-free navigation route is present between the cleaning robot and the target re-cleaning partition corresponding to the target candidate navigation route is determined again, and if so, this obstacle-free navigation route is taken as a new candidate navigation route of the target re-cleaning partition.

For example, the target area has 4 re-cleaning partitions: a re-cleaning partition 1, a re-cleaning partition 2, a re-cleaning partition 3, and a re-cleaning partition 4. The cleaning robot plans navigation routes to 4 re-cleaning partitions to obtain corresponding candidate navigation route 1, candidate navigation route 2, candidate navigation route 3, and candidate navigation route 4. A preset obstacle information database is invoked to inquire whether an obstacle is present on the 4 candidate navigation routes. After inquiry, an obstacle is absent on the candidate navigation route 1 and the candidate navigation route 2, and an obstacle is present on the candidate navigation route 3 and the candidate navigation route 4, however, the obstacle on the candidate navigation route 3 is at an entrance of the re-cleaning partition 3, and the obstacle on the candidate navigation route 4 is not at the entrance of the re-cleaning partition 4. The cleaning robot determines whether an obstacle-free navigation route to the re-cleaning partition 4 is present. After determination, an obstacle-free navigation route 4 is present, and the obstacle-free navigation route 4 is taken as a new candidate navigation route 4. Therefore, the re-cleaning partition 1, the re-cleaning partition 2, and the re-cleaning partition 4 are the re-cleaning partitions that the cleaning robot can reach.

405: If the re-cleaning partition that the cleaning robot can reach is present, navigating to a target partition, wherein the target partition is the re-cleaning partition that the cleaning robot can reach with the shortest distance; and if the re-cleaning partition that the cleaning robot can reach is present, determining whether the re-cleaning partition that the cleaning robot can reach is unique; if the re-cleaning partition that the cleaning robot can reach is unique, the unique re-cleaning partition that the cleaning robot can reach is designated as a target partition, and navigating to the target partition; if the re-cleaning partition that the cleaning robot can reach is not unique, calculating a distance between a current position point of the cleaning robot and a candidate point of each re-cleaning partition, wherein there are various distance calculation modes, such as a Euclidean distance, a navigation distance, or a Manhattan distance. Preferably, the Manhattan distance between each candidate point and the cleaning robot is calculated herein to obtain at least one Manhattan distance, and the candidate point is a contour point with the shortest straight-line distance between the re-cleaning partition and the current position point; screening the shortest Manhattan distance from a plurality of candidate Manhattan distances; and determining a re-cleaning partition corresponding to the shortest Manhattan distance as a target partition, and navigating to the target partition.

Two candidate point selection modes are provided, where the first mode is that a cleaning robot is taken as a center, all points on a grid map are scanned by adopting a breadth first search (BFS) algorithm, and the first scanned point belonging to a target reachable re-cleaning partition is taken as a candidate point of the target reachable re-cleaning partition; and the second mode is that the cleaning robot sends out sound wave signals or light signals to a target reachable re-cleaning partition for detection, and a point corresponding to the first received feedback signals is taken as a candidate point of the target reachable re-cleaning partition.

406: When the navigation ends, determining whether the navigation is successful, wherein the successful navigation means that the cleaning robot reaches an end of the planned navigation route;

When the cleaning robot reaches an end according to the planned navigation route, the navigation ends, and the navigation is successful in this case; and when the cleaning robot encounters an obstacle during the navigation to the target partition, the navigation ends, and the navigation is unsuccessful in this case.

407: If the navigation is successful, controlling the cleaning robot to clean the target partition, wherein if the navigation is successful, it means that the cleaning robot is located in the target partition, then the target partition is cleaned, wherein there are two cleaning modes:

the first cleaning mode is as follows: an along-wall mark and a cleaning mark are searched in the target partition, when the cleaning mark is present in the target partition, the cleaning robot moves to an end position of the cleaning mark, and starts to perform area cleaning from the end position according to a zigzag path; when a complete along-wall mark is present in the target partition, the cleaning robot moves to a corner position, and starts to perform area cleaning along the wall from the corner position according to a zigzag path; and when a partial along-wall is present in the target partition, the cleaning robot moves to the end position of the along-wall mark, continues to perform along-edge cleaning from the end position, and performs area cleaning according to a zigzag path after the along-edge cleaning is completed.

Figure 9:
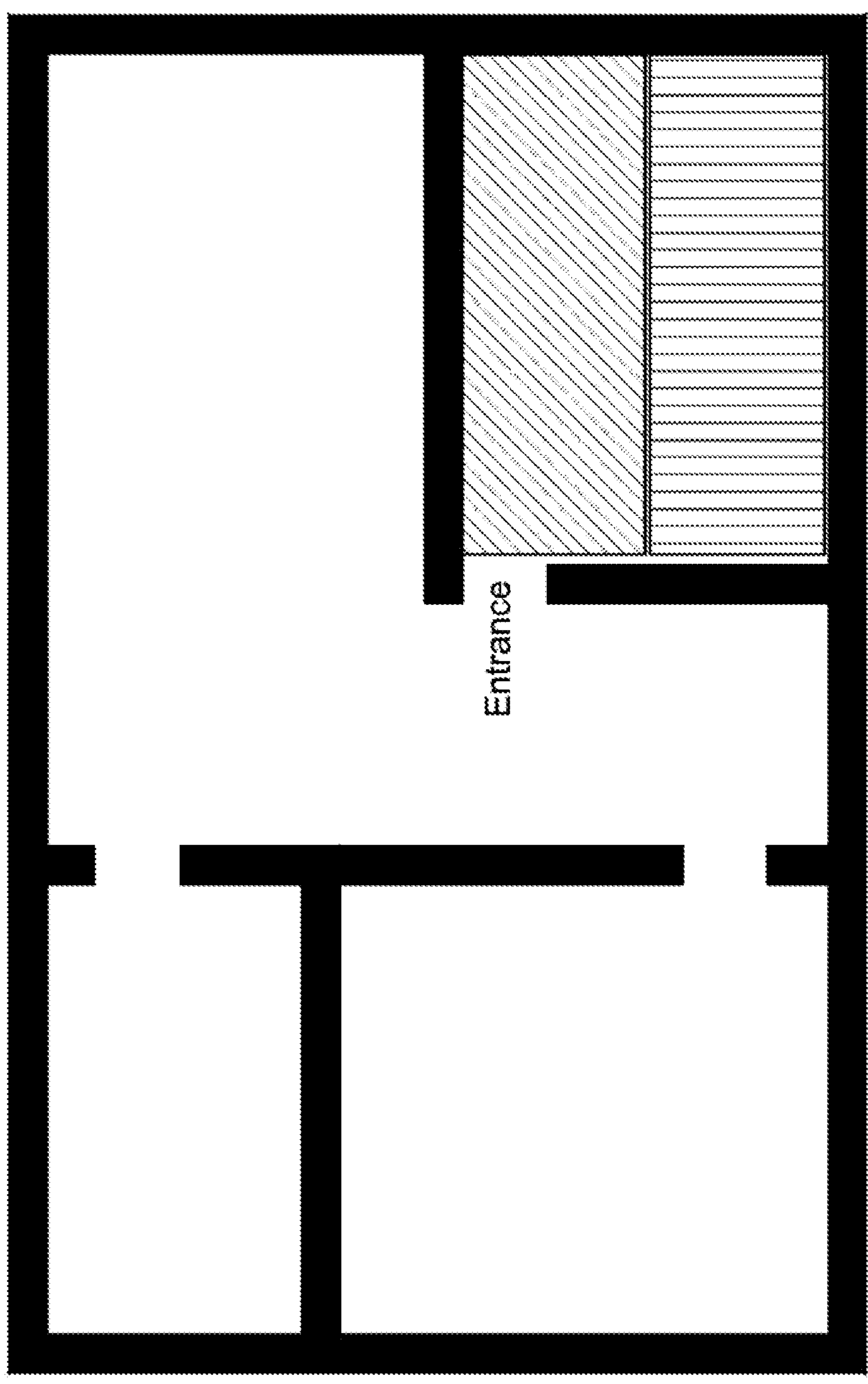
FIG. 9 is a schematic diagram of an area to assist in explaining a cleaning mode according to an embodiment of the present disclosure.

The second cleaning mode is as follows: an along-wall mark and a cleaning mark are searched in the target partition, for a part with the along-wall mark, an area cleaning is performed on the along-wall part to according to a zigzag path, wherein if after an area with the along-wall mark is cleaned, it is found that there are still un-cleaned parts in the current partition, then the along-edge cleaning is performed on the un-cleaned part first, and then the area cleaning is performed on the along-wall part according to a zigzag path. As shown in FIG. 9, the missed cleaning area includes a part of a diagonal line box on which an along-edge cleaning has been performed and a part of a vertical line box on which the along-edge cleaning has not been performed. If the cleaning robot can enter the missed cleaning area from entrance, the cleaning robot will firstly perform the zigzag area cleaning on the diagonal line box area on which the along-edge cleaning has been performed, and after the cleaning of the diagonal line box area is completed, the along-edge cleaning is performed on the vertical line box area, and then the area cleaning is performed according to a zigzag path.

After the cleaning of the target area is completed, returning to step 204 to determine whether there is any re-cleaning partition that the cleaning robot can reach, if so, selecting the next target partition, and if not, ending the cleaning ends.

408: If the navigation is unsuccessful, determining whether the cleaning robot is located in the target partition, if so, controlling the cleaning robot to clean the target partition, and if not, selecting a target partition again or ending the cleaning.

It should be additionally noted that the cleaning robot itself has a certain size, and in order to improve the cleaning efficiency, when a part of the cleaning robot enters the target partition, it is equivalent to that the cleaning robot is located in the target partition, therefore, a rule for determining whether the cleaning robot is located in the target partition is added as follows:

radiating and expanding the target partition by N grids, wherein N is a preset positive integer value, so as to obtain a target expanded partition; if the cleaning robot is completely located in the target expanded partitions, determining that the cleaning robot is located in the target partitions and cleans the target partitions, wherein the cleaning mode is as described in step 207 and details are not described herein again; and if the cleaning robots are not completely located in the target expansion partition, returning to step 204, determining whether a re-cleaning partition that the cleaning robot can reach is present, if so, selecting a next target partition, and if not, ending the cleaning.

In embodiments of the present disclosure, a partition that needs re-cleaning is identified from a primary cleaning partition according to the re-cleaning condition, so that a missed area that has not been cleaned yet is avoided; the latest state of the obstacle is ensured by maintaining the obstacle information database; a re-cleaning partition that the cleaning robot can reach and is closest to the cleaning robot is selected, so that the cleaning efficiency is improved; the result of navigating of the cleaning robot to the re-cleaning partition is determined, and the operations of cleaning, selecting a next re-cleaning partition or ending the cleaning are performed according to the determination result, so as to complete the cleaning of the re-cleaning partition to the maximum extent, and improve the cleaning quality of the target area.

Figure 10:
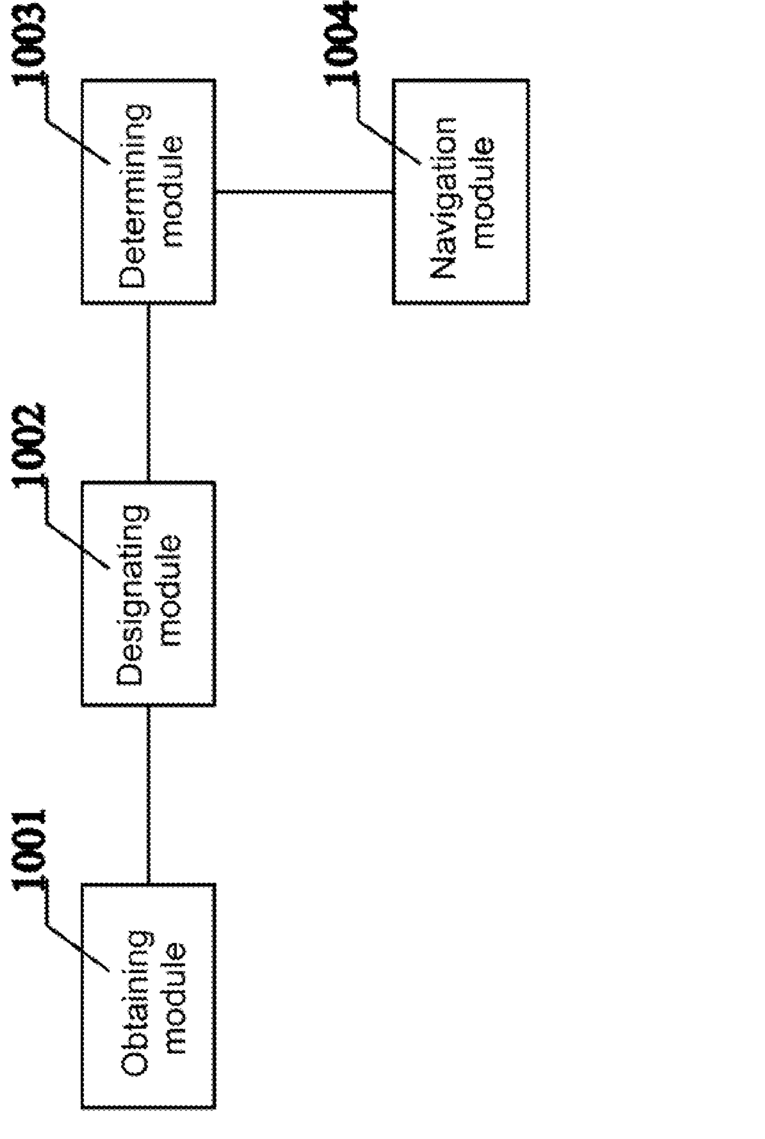
FIG. 10 is a schematic diagram of an embodiment of a second cleaning apparatus according to an embodiment of the present disclosure.

The method of re-cleaning according to an embodiment of the present disclosure is described above, and an apparatus of re-cleaning according to an embodiment of the present disclosure is described below. Referring to FIG. 10, an embodiment of an apparatus of re-cleaning according to an embodiment of the present disclosure includes:

an obtaining module 1001, configured to obtain a grid map of a target area, wherein the grid map includes at least one primary cleaning partition;

a designating module 1002, configured to determine whether a primary cleaning partition meeting a re-cleaning condition is present, if so, designate the primary cleaning partition meeting the re-cleaning condition as a re-cleaning partition to obtain at least one re-cleaning partition, wherein the re-cleaning condition is that the primary cleaning partition is provided with an along-wall mark and is not filled up by a cleaning mark;

a determining module 1003, configured to determine whether a re-cleaning partition that a cleaning robot can reach is present in the at least one re-cleaning partition according to a preset obstacle information database, wherein the obstacle information database is configured to record real-time obstacle information identified during the cleaning process; and a navigation module 1004, configured to navigate to a target partition for cleaning if the re-cleaning partition that the cleaning robot can reach is present, wherein the target partition is the re-cleaning partition that the cleaning robot can reach with the shortest distance.

In embodiments of the present disclosure, a partition that needs re-cleaning is identified from a primary cleaning partition according to the re-cleaning condition, so that a missed area that has not been cleaned yet is avoided, and a re-cleaning partition that the cleaning robot can reach and is closest to the cleaning robot is selected, so that the cleaning efficiency is improved; and the cleaning robot performs the area cleaning after reaching the re-cleaning partition, so that the cleaning quality of the target area is improved.

Figure 11:
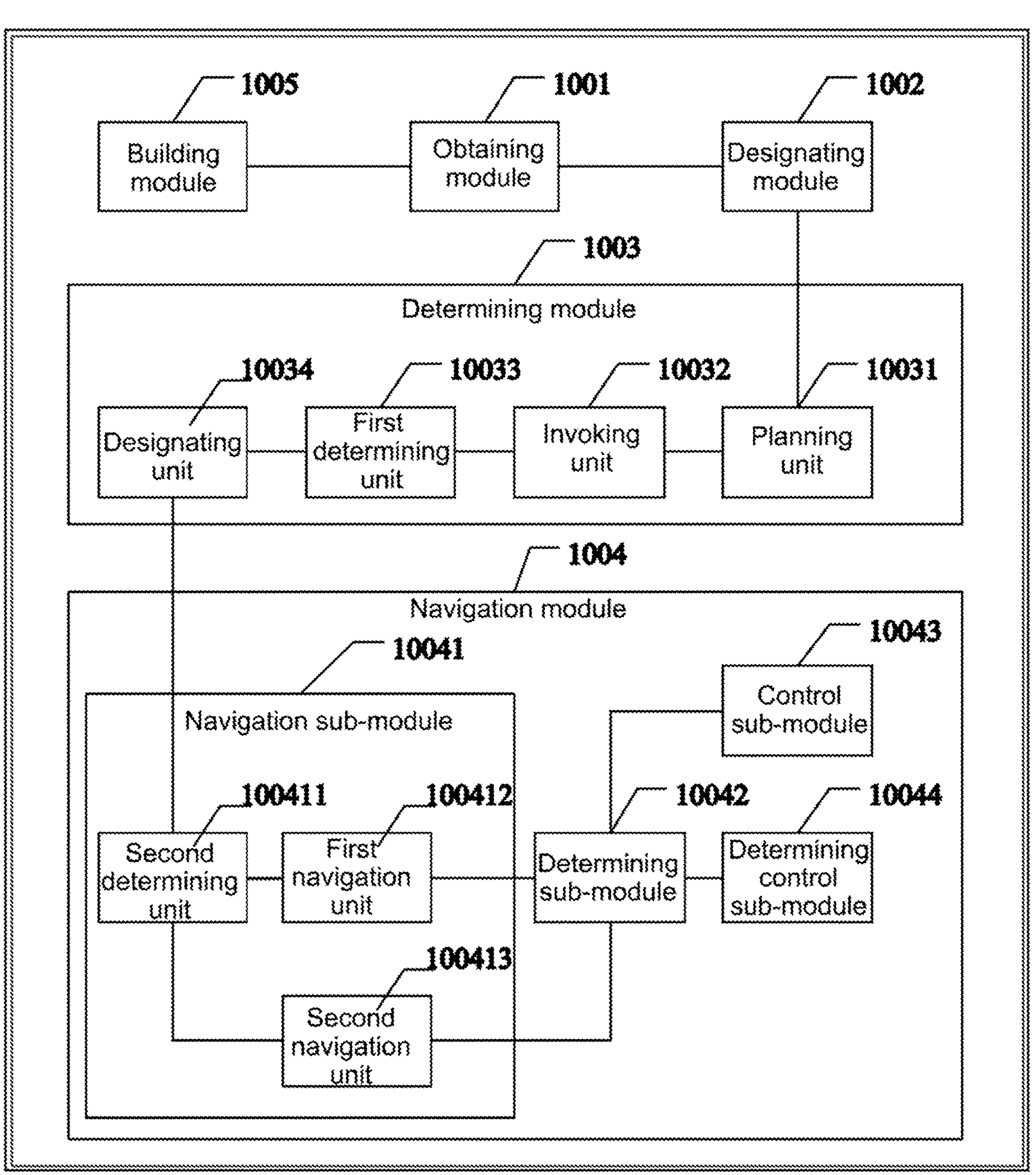
FIG. 11 is a schematic diagram of another embodiment of an apparatus of re-cleaning according to an embodiment of the present disclosure.

Referring to FIG. 11, another embodiment of an apparatus of re-cleaning according to an embodiment of the present disclosure includes:

an obtaining module 1001, configured to obtain a grid map of a target area, wherein the grid map includes at least one primary cleaning partition;

a designating module 1002, configured to determine whether a primary cleaning partition meeting a re-cleaning condition is present, if so, designate the primary cleaning partition meeting the re-cleaning condition as a re-cleaning partition to obtain at least one re-cleaning partition, wherein the re-cleaning condition is that the primary cleaning partition is provided with an along-wall mark and is not filled up by a cleaning mark;

a determining module 1003, configured to determine whether a re-cleaning partition that a cleaning robot can reach is present in the at least one re-cleaning partition according to a preset obstacle information database, wherein the obstacle information database is configured to record real-time obstacle information identified during the cleaning process; and a navigation module 1004, configured to navigate to a target partition for cleaning if the re-cleaning partition that the cleaning robot can reach is present, wherein the target partition is the re-cleaning partition that the cleaning robot can reach with the shortest distance.

Optionally, the determining module 1003 includes:

a planning unit 10031, configured to plan a navigation route from the cleaning robot to each re-cleaning partition in the at least one re-cleaning partition, so as to obtain at least one candidate navigation route;

an invoking unit 10032, configured to invoke the preset obstacle information database to inquire the real-time obstacle information on the at least one candidate navigation route;

a first determining unit 10033, configured to determine whether at least one obstacle-free navigation route is present in the at least one candidate navigation route according to the real-time obstacle information present on the at least one candidate navigation route; and a determining unit 10034, configured to determine, if the re-cleaning partition is present, a re-cleaning partition corresponding to the at least one obstacle-free navigation route as a re-cleaning partition that the cleaning robot can reach.

Optionally, the planning unit 10031 is specifically configured to:

determine at least one candidate point according to a current position point of the cleaning robot, wherein the candidate point is a contour point with the shortest straight-line distance between the re-cleaning partition and the current position point; and plan a navigation route from the current position point to each candidate point to obtain at least one navigation route.

Optionally, the navigation module 1004 includes:

a navigation sub-module 10041, configured to navigate to a target partition if the re-cleaning partition that the cleaning robot can reach is present;

a determining sub-module 10042, configured to determine whether the navigation is successful when the navigation ends, wherein the navigation is successful means that the cleaning robot reaches an end of the planned navigation route;

a control sub-module 10043, configured to control the cleaning robot to clean the target partition if the navigation is successful; and a determining control sub-module 10044, configured to determine, if the navigation is unsuccessful, whether the cleaning robot is located in the target partition, if so, control the cleaning robot to clean the target partition, and if not, select a target partition again or end the cleaning.

Optionally, the navigation sub-module 10041 includes:

a second determining unit 100411, configured to determine, if the re-cleaning partition that the cleaning robot can reach is present, whether the re-cleaning partition that the cleaning robot can reach is unique;

a first navigation unit 100412, configured to designate the unique re-cleaning partition that the cleaning robot can reach as a target partition and navigate to the target partition if the re-cleaning partition that the cleaning robot can reach is unique; and a second navigation unit 100413, configured to designate a re-cleaning partition closest to the cleaning robot as a target partition and navigate to the target partition if the re-cleaning partition that the cleaning robot can reach is not unique.

Optionally, the second navigation unit 100413 is specifically configured to:

if the re-cleaning partition that the cleaning robot can reach is not unique, calculate a Manhattan distance between the current position point of the cleaning robot and a candidate point of each re-cleaning partition, so as to obtain at least one candidate Manhattan distance, wherein the candidate point is a contour point with the shortest straight-line distance between the re-cleaning partition and the current position point; screen the shortest Manhattan distance from a plurality of candidate Manhattan distances; and designate a re-cleaning partition corresponding to the shortest Manhattan distance as a target partition, and navigate to the target partition.

Optionally, the apparatus of re-cleaning further includes a building module 1005, wherein the building module 1005 is specifically configured to:

establish an obstacle information database, wherein the obstacle information database is configured to record real-time obstacle information identified by the cleaning robot during the cleaning process, and the obstacle information includes a position of an obstacle, a picture of an obstacle, a surrounding environment picture of an obstacle, and a state of an obstacle; when the cleaning robot identifies a newly added obstacle, add information of the newly added obstacle to the obstacle information database; and when the cleaning robot identifies that a position of a target obstacle recorded in the obstacle information database has changed, update information of the target obstacle in the obstacle information database.

In embodiments of the present disclosure, a partition that needs re-cleaning is identified from a primary cleaning partition according to the re-cleaning condition, so that a missed area that has not been cleaned yet is avoided; the latest state of the obstacle is ensured by maintaining the obstacle information database; a re-cleaning partition that the cleaning robot can reach and is closest to the cleaning robot is selected, so that the cleaning efficiency is improved; the result of navigating of the cleaning robot to the re-cleaning partition is determined, and the operations of cleaning, selecting a next re-cleaning partition or ending the cleaning are performed according to the determination result, so as to complete the cleaning of the re-cleaning partition to the maximum extent, and improve the cleaning quality of the target area.

The above FIG. 10 and FIG. 11 describe the apparatus of re-cleaning according to an embodiment of the present disclosure in detail from a perspective of a modular functional entity, and the following describes the cleaning robot according to an embodiment of the present disclosure in detail from a perspective of hardware processing.

Figure 12:
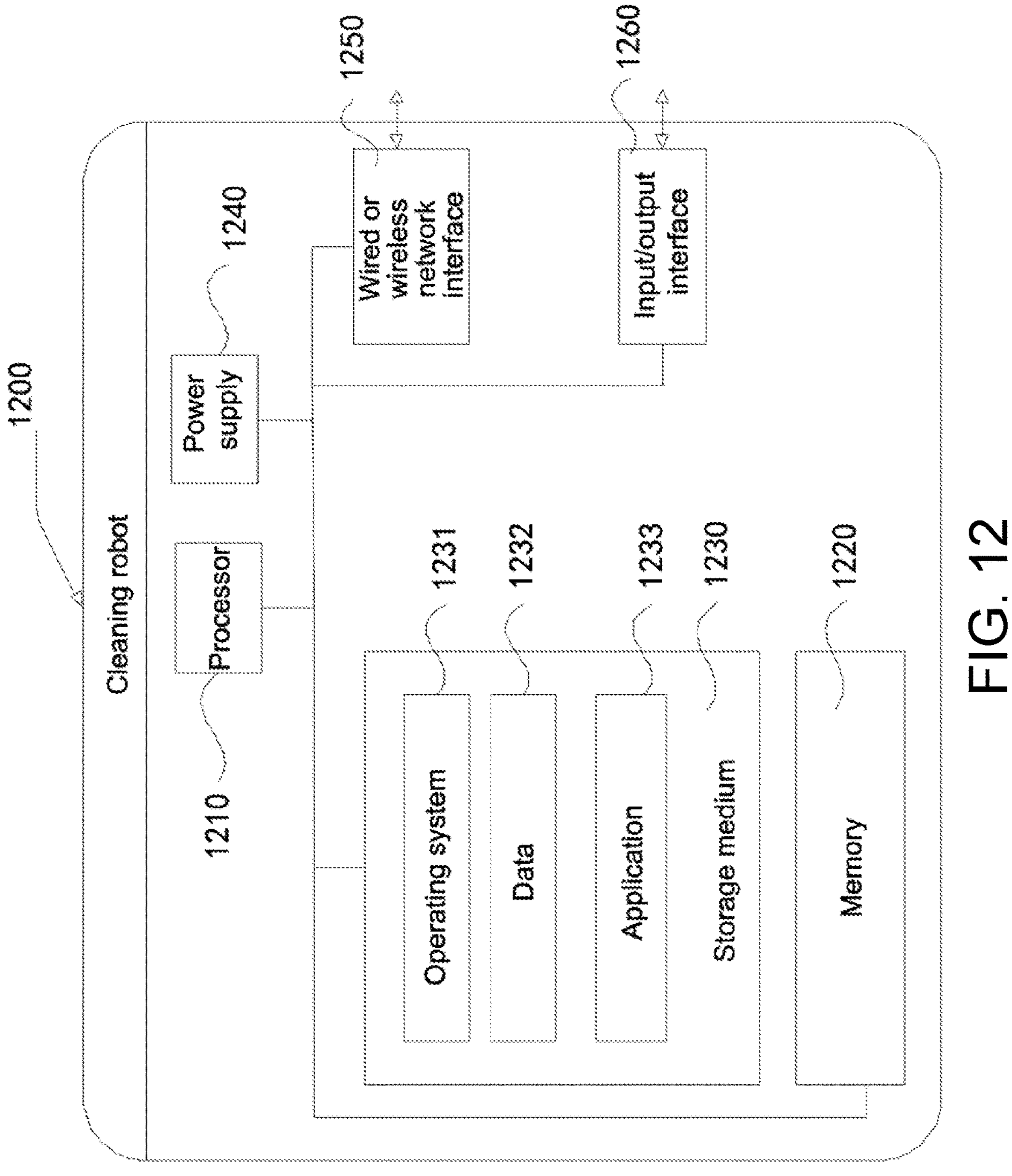
FIG. 12 is a schematic diagram of an embodiment of a cleaning robot according to an embodiment of the present disclosure.

FIG. 12 is a schematic diagram of a structure of a cleaning robot according to an embodiment of the present disclosure. The cleaning robot 1200 may have a relatively large difference due to different configurations or performance, and may include one or more central processing units (CPU) 1210 (for example, one or more processors) and a memory 1220, and one or more storage media 530 (for example, one or more mass storage devices) that store an application program 1233 or data 1232. Herein, the memory 1220 and the storage medium 1230 may perform transitory storage or persistent storage. A program stored in the storage medium 1230 may include one or more modules (not shown in the figure), and each module may include a series of instruction operations for the cleaning robot 1200. Still further, the central processing unit 1210 may be configured to communicate with the storage medium 1230, and perform, on the cleaning robot 1200, the series of instruction operations in the storage medium 1230.

The cleaning robot 1200 may further include one or more power supplies 1240, one or more wired or wireless network interfaces 1250, one or more input/output interfaces 1260, and/or one or more operating systems 1231, such as Windows Serve, Mac OS X, Unix, Linux, and FreeBSD. Those skilled in the art can understand that the structure of the cleaning robot shown in FIG. 12 does not constitute any limitation on the cleaning robot, and the cleaning robot may include more or fewer components than those shown in the figure, or have some components combined, or have different arrangements of components.

The present disclosure further provides a computer device, wherein the computer device includes a memory and a processor, the memory stores computer readable instructions, and the computer readable instructions, when executed by the processor, make the processor perform the steps of the method of re-cleaning in the above embodiments.

The present disclosure further provides a computer-readable storage medium, wherein the computer-readable storage medium may be a non-volatile computer-readable storage medium and may also be a volatile computer-readable storage medium, and the computer-readable storage medium stores instructions, wherein the instructions, when run on a computer, makes the computer perform the steps of the method of re-cleaning.

It may be clearly understood by those skilled in the art that, for the purpose of convenient and brief description, for a detailed working process of the foregoing systems, apparatuses, and units, reference can be made to a corresponding process in the foregoing method embodiments, and details are not described herein again.

When the integrated unit is implemented in the form of the software functional unit and sold or used as an independent product, it may be stored in a computer-readable storage medium. Based on such an understanding, the technical solutions of the present disclosure in essence, or the part contributing to a conventional technology, or all or part of the technical solutions may be implemented in the form of a software product, and the computer software product is stored in a storage medium and includes several instructions for making a computer device (which may be a personal computer, a server, a network device, or the like) to perform all or a part of the steps of the methods described in embodiments of the present disclosure. The foregoing storage medium includes any medium that can store program code, for example, a USB flash drive, a removable hard disk, a read-only memory (ROM), a random access memory (RAM), a floppy disk, or a compact disc.

The foregoing embodiments are merely intended for describing the technical solutions of the present disclosure other than limiting the present disclosure. Although the present disclosure is described in detail with reference to the foregoing embodiments, those ordinary skilled in the art should understand that they may still make modifications to the technical solutions described in the foregoing embodiments or make equivalent replacements to some technical features thereof, without departing from the spirit and scope of the technical solutions of embodiments of the present disclosure.

What is claimed is:

1. A method of re-cleaning, comprising:

Obtaining, by at least one processer, a grid map of a target area, wherein the grid map comprises at least one primary cleaning partition;

determining, by the at least one processer, whether primary cleaning partitions meeting the re-cleaning condition is present, in response to the primary cleaning partitions meeting the re-cleaning condition being present, designating the primary cleaning partition meeting the re-cleaning condition as a re-cleaning partition, so as to obtain at least one re-cleaning partition, wherein the re-cleaning condition is that the primary cleaning partition is provided with an along-wall mark and is not filled up by a cleaning mark;

determining, by the at least one processer, whether re-cleaning partitions that a cleaning robot can reach are present in the at least one re-cleaning partition according to a preset obstacle information database, wherein the obstacle information database is configured to record real-time obstacle information identified during cleaning process; and navigating, by the at least one processer, to a target partition for cleaning in response to the re-cleaning partition that the cleaning robot can reach being present, wherein the target partition is the re-cleaning partition that the cleaning robot can reach with the shortest distance, wherein;

the process of navigating to a target partition for cleaning in response to the re-cleaning partition that the cleaning robot can reach being present wherein the target partition is the re-cleaning partition that the cleaning robot can reach with the shortest distance comprises:

navigating to the target partition in response to the re-cleaning partition that the cleaning robot can reach being present;

determining whether navigation is successful when the navigation ends, wherein the navigation is successful means that the cleaning robot reaches an end of a planned navigation route;

controlling, in response to the navigation being successful, the cleaning robot to clean the target partition; and determining, in response to the navigation being unsuccessful, whether the cleaning robot is located in the target partition, in response to the cleaning robot being located in the target partition, controlling the cleaning robot to clean the target partition, and in response to the cleaning robot being not located in the target partition, selecting a target partition again or ending cleaning.

2. The method of re-cleaning according to claim 1, wherein the process of determining whether re-cleaning partitions that a cleaning robot can reach are present in the at least one re-cleaning partition according to a preset obstacle information database comprises:

planning a navigation route of the cleaning robot to each re-cleaning partition in the at least one re-cleaning partition, so as to obtain at least one candidate navigation route;

invoking the preset obstacle information database to inquire the real-time obstacle information on the at least one candidate navigation route; and determining whether at least one obstacle-free navigation route is present in the at least one candidate navigation route according to the real-time obstacle information on the at least one candidate navigation route, wherein if so, a re-cleaning partition corresponding to the at least one obstacle-free navigation route is designated as the re-cleaning partition that the cleaning robot can reach.

3. The method of re-cleaning according to claim 2, wherein the process of planning a navigation route of the cleaning robot to each re-cleaning partition in the at least one re-cleaning partition so as to obtain at least one candidate navigation route comprises:

determining at least one candidate point according to a current position point of the cleaning robot, wherein the candidate point is a contour point with the shortest straight-line distance between the re-cleaning partition and the current position point; and planning a navigation route from the current position point to each candidate point, so as to obtain at least one navigation route.

4. The method of re-cleaning according to claim 1, wherein the process of navigating to a target partition in response to the re-cleaning partition that the cleaning robot can reach being present comprises:

determining whether the re-cleaning partition that the cleaning robot can reach is unique in response to the re-cleaning partition that the cleaning robot can reach being present, wherein in response to the re-cleaning partition that the cleaning robot can reach being unique, the unique re-cleaning partition that the cleaning robot can reach is designate as the target partition, and the cleaning robot is navigated to the target partition; and in response to the re-cleaning partition that the cleaning robot can reach being not unique, a re-cleaning partition closest to the cleaning robot is designate as the target partition, and the cleaning robot is navigated to the target partition.

5. The method of re-cleaning according to claim 1, wherein the process of designating a re-cleaning partition closest to the cleaning robot as a target partition and navigating to the target partition in response to the re-cleaning partition that the cleaning robot can reach being not unique comprises:

calculating, in response to the re-cleaning partition that the cleaning robot can reach being not unique, a Manhattan distance between a current position point of the cleaning robot and a candidate point of each re-cleaning partition, so as to obtain at least one candidate Manhattan distance, wherein the candidate point is a contour point with the shortest straight-line distance between the re-cleaning partition and the current position point;

screening the shortest Manhattan distance from a plurality of the candidate Manhattan distances; and designating a re-cleaning partition corresponding to the shortest Manhattan distance as the target partition, and navigating to the target partition.

6. The method of re-cleaning according to claim 1, wherein the method comprises, before the process of obtaining a grid map of a target area:

establishing an obstacle information database, wherein the obstacle information database is configured to record the real-time obstacle information identified by the cleaning robot during the cleaning process, and the obstacle information comprises a position of an obstacle, a picture of the obstacle, a surrounding environment picture of the obstacle, and a state of the obstacle;

adding information of a newly added obstacle to the obstacle information database when the cleaning robot identifies the newly added obstacle; and updating information of a target obstacle in the obstacle information database when the cleaning robot identifies that a position of the target obstacle that has been recorded in the obstacle information database changes.

7. A cleaning robot, comprising: a memory and at least one processor, wherein the memory stores instructions; and the at least one processor invokes the instructions in the memory, so as to make the cleaning robot perform the method of re-cleaning according to claim 1.

8. The method of re-cleaning according to claim 2, wherein the method comprises, before the process of obtaining a grid map of a target area:

establishing an obstacle information database, wherein the obstacle information database is configured to record the real-time obstacle information identified by the cleaning robot during the cleaning process, and the obstacle information comprises a position of an obstacle, a picture of the obstacle, a surrounding environment picture of the obstacle, and a state of the obstacle;

adding information of a newly added obstacle to the obstacle information database when the cleaning robot identifies the newly added obstacle; and updating information of a target obstacle in the obstacle information database when the cleaning robot identifies that a position of the target obstacle that has been recorded in the obstacle information database changes.

9. The method of re-cleaning according to claim 3, wherein the method comprises, before the process of obtaining a grid map of a target area:

establishing an obstacle information database, wherein the obstacle information database is configured to record the real-time obstacle information identified by the cleaning robot during the cleaning process, and the obstacle information comprises a position of an obstacle, a picture of the obstacle, a surrounding environment picture of the obstacle, and a state of the obstacle;

adding information of a newly added obstacle to the obstacle information database when the cleaning robot identifies the newly added obstacle; and updating information of a target obstacle in the obstacle information database when the cleaning robot identifies that a position of the target obstacle that has been recorded in the obstacle information database changes.

10. The method of re-cleaning according to claim 1, wherein the method comprises, before the process of obtaining a grid map of a target area:

establishing an obstacle information database, wherein the obstacle information database is configured to record the real-time obstacle information identified by the cleaning robot during the cleaning process, and the obstacle information comprises a position of an obstacle, a picture of the obstacle, a surrounding environment picture of the obstacle, and a state of the obstacle;

adding information of a newly added obstacle to the obstacle information database when the cleaning robot identifies the newly added obstacle; and updating information of a target obstacle in the obstacle information database when the cleaning robot identifies that a position of the target obstacle that has been recorded in the obstacle information database changes.

11. The method of re-cleaning according to claim 4, wherein the method comprises, before the process of obtaining a grid map of a target area:

establishing an obstacle information database, wherein the obstacle information database is configured to record the real-time obstacle information identified by the cleaning robot during the cleaning process, and the obstacle information comprises a position of an obstacle, a picture of the obstacle, a surrounding environment picture of the obstacle, and a state of the obstacle;

adding information of a newly added obstacle to the obstacle information database when the cleaning robot identifies the newly added obstacle; and updating information of a target obstacle in the obstacle information database when the cleaning robot identifies that a position of the target obstacle that has been recorded in the obstacle information database changes.

12. The method of re-cleaning according to claim 5, wherein the method comprises, before the process of obtaining a grid map of a target area:

establishing an obstacle information database, wherein the obstacle information database is configured to record the real-time obstacle information identified by the cleaning robot during the cleaning process, and the obstacle information comprises a position of an obstacle, a picture of the obstacle, a surrounding environment picture of the obstacle, and a state of the obstacle;

adding information of a newly added obstacle to the obstacle information database when the cleaning robot identifies the newly added obstacle; and updating information of a target obstacle in the obstacle information database when the cleaning robot identifies that a position of the target obstacle that has been recorded in the obstacle information database changes.

13. The cleaning robot according to claim 7, wherein the process of determining whether re-cleaning partitions that a cleaning robot can reach are present in the at least one re-cleaning partition according to a preset obstacle information database comprises:

planning a navigation route of the cleaning robot to each re-cleaning partition in the at least one re-cleaning partition, so as to obtain at least one candidate navigation route;

invoking the preset obstacle information database to inquire the real-time obstacle information on the at least one candidate navigation route; and determining whether at least one obstacle-free navigation route is present in the at least one candidate navigation route according to the real-time obstacle information on the at least one candidate navigation route, wherein in response to the at least one obstacle-free navigation route being present in the at least one candidate navigation route, a re-cleaning partition corresponding to the at least one obstacle-free navigation route is designate as the re-cleaning partition that the cleaning robot can reach.

14. The cleaning robot according to claim 7, wherein the process of planning a navigation route of the cleaning robot to each re-cleaning partition in the at least one re-cleaning partition so as to obtain at least one candidate navigation route comprises:

determining at least one candidate point according to a current position point of the cleaning robot, wherein the candidate point is a contour point with the shortest straight-line distance between the re-cleaning partition and the current position point; and planning a navigation route from the current position point to each candidate point, so as to obtain at least one navigation route.

15. The cleaning robot according to claim 7, wherein the process of navigating to a target partition for cleaning in response to the re-cleaning partition that the cleaning robot can reach being present wherein the target partition is the re-cleaning partition that the cleaning robot can reach with the shortest distance comprises:

navigating to the target partition in response to the re-cleaning partition that the cleaning robot can reach being present;

determining whether navigation is successful when the navigation ends, wherein the navigation is successful means that the cleaning robot reaches an end of a planned navigation route;

controlling, in response to the navigation being successful, the cleaning robot to clean the target partition; and determining, in response to the navigation being unsuccessful, whether the cleaning robot is located in the target partition, in response to the cleaning robot being located in the target partition, controlling the cleaning robot to clean the target partition, and in response to the cleaning robot being not located in the target partition, selecting a target partition again or ending cleaning.

16. The cleaning robot according to claim 7, wherein the process of navigating to a target partition in response to the re-cleaning partition that the cleaning robot can reach being present comprises:

determining whether the re-cleaning partition that the cleaning robot can reach is unique in response to the re-cleaning partition that the cleaning robot can reach being present, wherein in response to the re-cleaning partition that the cleaning robot can reach being unique, the unique re-cleaning partition that the cleaning robot can reach is designated as the target partition, and the cleaning robot is navigated to the target partition; and in response to the re-cleaning partition that the cleaning robot can reach being not unique, a re-cleaning partition closest to the cleaning robot is designated as the target partition, and the cleaning robot is navigated to the target partition.

17. The cleaning robot according to claim 7, wherein the process of designating a re-cleaning partition closest to the cleaning robot as a target partition and navigating to the target partition in response to the re-cleaning partition that the cleaning robot can reach being not unique comprises:

calculating, in response to the re-cleaning partition that the cleaning robot can reach being not unique, a Manhattan distance between a current position point of the cleaning robot and a candidate point of each re-cleaning partition, so as to obtain at least one candidate Manhattan distance, wherein the candidate point is a contour point with the shortest straight-line distance between the re-cleaning partition and the current position point;

screening the shortest Manhattan distance from a plurality of the candidate Manhattan distances; and designating a re-cleaning partition corresponding to the shortest Manhattan distance as the target partition, and navigating to the target partition.

18. The cleaning robot according to claim 7, wherein the method comprises, before the process of obtaining a grid map of a target area:

establishing an obstacle information database, wherein the obstacle information database is configured to record the real-time obstacle information identified by the cleaning robot during the cleaning process, and the obstacle information comprises a position of an obstacle, a picture of the obstacle, a surrounding environment picture of the obstacle, and a state of the obstacle;

adding information of a newly added obstacle to the obstacle information database when the cleaning robot identifies the newly added obstacle; and updating information of a target obstacle in the obstacle information database when the cleaning robot identifies that a position of the target obstacle that has been recorded in the obstacle information database changes.

* * * * *